US011990143B2

(12) United States Patent
Sharma et al.

(10) Patent No.: US 11,990,143 B2
(45) **Date of Patent: *May 21, 2024**

(54) MULTI-MODE AUDIO RECOGNITION AND AUXILIARY DATA ENCODING AND DECODING

(71) Applicant: Digimarc Corporation, Beaverton, OR (US)

(72) Inventors: Ravi K. Sharma, Portland, OR (US); Brett A. Bradley, Portland, OR (US); Yang Bai, Beaverton, OR (US); Shankar Thagadur Shivappa, San Diego, CA (US); Ajith Kamath, Beaverton, OR (US); Aparna Gurijala, Port Coquilam (CN); Tomas Filler, Tigard, OR (US); David A. Cushman, McMinnville, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,884

(22) Filed: Nov. 22, 2021

(65) Prior Publication Data

US 2022/0335959 A1 Oct. 20, 2022

Related U.S. Application Data

(63) Continuation of application No. 16/751,629, filed on Jan. 24, 2020, now Pat. No. 11,183,198, which is a (Continued)

(51) Int. Cl.

| | |
|---|---|
| ***G10L 19/00*** | (2013.01) |
| ***G10L 19/018*** | (2013.01) |
| ***G10L 19/02*** | (2013.01) |

(52) U.S. Cl.
CPC ............ *G10L 19/018* (2013.01); *G10L 19/02* (2013.01)

(58) Field of Classification Search
CPC ..... G10L 19/018; G10L 19/03; G10L 19/167; H04B 1/7115
See application file for complete search history.

(56) References Cited

U.S. PATENT DOCUMENTS

| | | | |
|---|---|---|---|
| 4,495,620 | A | 1/1985 | Steele |
| 5,079,648 | A | 1/1992 | Maufe |

(Continued)

FOREIGN PATENT DOCUMENTS

| | | | |
|---|---|---|---|
| EP | 2362387 | A1 | 8/2011 |
| WO | 0106703 | A1 | 1/2001 |
| WO | 2007006623 | | 1/2007 |

OTHER PUBLICATIONS

Arnold M, 'Audio watermarking: features, applications and algorithms', Multimedia and Expo, 2000. ICME 2000. 2000 IEEE International Conference On New York, NY, USA Jul. 30-Aug. 2, 2000, Piscataway, NJ, USA,IEEE, US, vol. 2, doi: 10.1109/ ICME. 2000.871531, ISBN 978-0-7803-6536-0, pp. 1013-1016, XP010513181.

(Continued)

*Primary Examiner* — Daniel Abebe
(74) *Attorney, Agent, or Firm* — Digimarc Corporation

(57) ABSTRACT

Audio signal processing enhances audio watermark embedding and detecting processes. Audio signal processes include audio classification and adapting watermark embedding and detecting based on classification. Advances in audio watermark design include adaptive watermark signal structure data protocols, perceptual models, and insertion methods. Perceptual and robustness evaluation is integrated into audio watermark embedding to optimize audio quality relative the original signal, and to optimize robustness or data capacity. These methods are applied to audio segments in audio (Continued)

embedder and detector configurations to support real time operation. Feature extraction and matching are also used to adapt audio watermark embedding and detecting.

18 Claims, 6 Drawing Sheets

Related U.S. Application Data continuation of application No. 15/848,339, filed on Dec. 20, 2017, now Pat. No. 10,546,590, which is a continuation of application No. 15/090,279, filed on Apr. 4, 2016, now Pat. No. 9,852,736, which is a continuation of application No. 14/054,492, filed on Oct. 15, 2013, now Pat. No. 9,305,559, which is a continuation-in-part of application No. 13/841,727, filed on Mar. 15, 2013, now Pat. No. 9,401,153.

(60) Provisional application No. 61/714,019, filed on Oct. 15, 2012.

(56) References Cited

U.S. PATENT DOCUMENTS

| | | | | |
|---|---|---|---|---|
| 5,450,490 | A | 9/1995 | Jensen | |
| 5,613,004 | A | 3/1997 | Cooperman | |
| 5,748,763 | A | 5/1998 | Rhoads | |
| 5,768,426 | A | 6/1998 | Rhoads | |
| 5,774,452 | A | 6/1998 | Wolosewicz | |
| 5,918,223 | A | 6/1999 | Blum | |
| 6,031,914 | A | 2/2000 | Tevfik | |
| 6,061,793 | A | 5/2000 | Tewfik | |
| 6,320,965 | B1 | 11/2001 | Levine | |
| 6,332,194 | B1 | 12/2001 | Bloom | |
| 6,363,159 | B1 | 3/2002 | Rhoads | |
| 6,442,283 | B1 | 8/2002 | Tewfik | |
| 6,442,285 | B2 | 8/2002 | Rhoads | |
| 6,505,160 | B1 | 1/2003 | Levy | |
| 6,557,103 | B1 | 4/2003 | Boncelet | |
| 6,571,144 | B1 | 5/2003 | Moses | |
| 6,614,914 | B1 | 9/2003 | Rhoads | |
| 6,674,861 | B1 | 1/2004 | Xu | |
| 6,674,876 | B1 | 1/2004 | Hannigan | |
| 6,717,976 | B1 | 4/2004 | Shen | |
| 6,738,495 | B2 | 5/2004 | Rhoads | |
| 6,751,337 | B2 | 6/2004 | Tewfik | |
| 6,968,564 | B1 | 11/2005 | Srinivasan | |
| 6,988,202 | B1 | 1/2006 | Rhoads | |
| 7,003,132 | B2 | 2/2006 | Rhoads | |
| 7,003,731 | B1 | 2/2006 | Rhoads | |
| 7,006,555 | B1 | 2/2006 | Srinivasan | |
| 7,054,465 | B2 | 5/2006 | Rhoads | |
| 7,076,082 | B2 | 7/2006 | Sharma | |
| 7,113,615 | B2 | 9/2006 | Rhoads | |
| 7,142,691 | B2 | 11/2006 | Levy | |
| 7,146,503 | B1 * | 12/2006 | Johnston | G10L 19/022 704/E19.009 |
| 7,263,203 | B2 | 8/2007 | Rhoads | |
| 7,352,878 | B2 | 4/2008 | Reed | |
| 7,487,356 | B2 | 2/2009 | Kunisa | |
| 7,508,944 | B1 | 3/2009 | Brunk | |
| 7,587,602 | B2 | 9/2009 | Rhoads | |
| 7,643,649 | B2 | 1/2010 | Davis | |
| 7,668,334 | B2 | 2/2010 | Reed | |
| 7,773,770 | B2 | 8/2010 | Evans | |
| 7,965,863 | B2 | 6/2011 | Jones | |
| 8,107,674 | B2 | 1/2012 | Davis | |
| 8,306,811 | B2 | 11/2012 | Tewfik | |
| 8,355,514 | B2 | 1/2013 | Rhoads | |
| 8,477,990 | B2 | 7/2013 | Reed | |
| 8,483,426 | B2 | 7/2013 | Rhoads | |
| 8,488,745 | B2 | 7/2013 | Cutler | |
| 8,791,789 | B2 | 7/2014 | Petrovic | |
| 8,873,797 | B2 | 10/2014 | Reed | |
| 8,965,547 | B2 * | 2/2015 | Wabnik | G10L 19/018 381/56 |
| 9,269,363 | B2 * | 2/2016 | Radhakrishnan | G10L 19/018 |
| 9,466,307 | B1 | 10/2016 | Sharma | |
| 9,509,882 | B2 | 11/2016 | Reed | |
| 9,979,691 | B2 | 5/2018 | Lord | |
| 10,042,038 | B1 | 8/2018 | Lord | |
| 10,147,433 | B1 | 12/2018 | Bradley | |
| 10,236,006 | B1 | 3/2019 | Gurijala | |
| 10,236,031 | B1 * | 3/2019 | Gurijala | G10L 19/018 |
| 2001/0029580 | A1 | 10/2001 | Moskowitz | |
| 2001/0032313 | A1 * | 10/2001 | Haitsma | G11B 20/10527 713/193 |
| 2002/0051560 | A1 | 5/2002 | Donescu | |
| 2002/0090111 | A1 | 7/2002 | Fukushima | |
| 2002/0097892 | A1 | 7/2002 | Oami | |
| 2004/0006696 | A1 * | 1/2004 | Shin | G11B 20/00891 704/E19.009 |
| 2004/0024588 | A1 | 2/2004 | Watson | |
| 2004/0077357 | A1 | 4/2004 | Nakada | |
| 2004/0125952 | A1 * | 7/2004 | Alattar | G06T 1/0085 380/202 |
| 2004/0137929 | A1 | 7/2004 | Jones | |
| 2004/0151313 | A1 | 8/2004 | Weirauch | |
| 2004/0184369 | A1 | 9/2004 | Herre | |
| 2004/0267533 | A1 | 12/2004 | Hannigan | |
| 2005/0066176 | A1 | 3/2005 | Mihcak | |
| 2005/0144006 | A1 | 6/2005 | Oh | |
| 2006/0012831 | A1 | 1/2006 | Narimatsu | |
| 2007/0116324 | A1 | 5/2007 | Baum | |
| 2008/0002854 | A1 * | 1/2008 | Tehranchi | H04N 21/8358 382/100 |
| 2008/0027729 | A1 | 1/2008 | Herre | |
| 2008/0027734 | A1 | 1/2008 | Zhao | |
| 2008/0181449 | A1 | 7/2008 | Hannigan | |
| 2008/0215333 | A1 | 9/2008 | Tevfik | |
| 2009/0259325 | A1 | 10/2009 | Topchy | |
| 2010/0183162 | A1 | 7/2010 | Moulin | |
| 2010/0322469 | A1 | 12/2010 | Sharma | |
| 2011/0029370 | A1 | 2/2011 | Roeding | |
| 2011/0161076 | A1 | 6/2011 | Davis | |
| 2011/0261257 | A1 | 10/2011 | Terry | |
| 2012/0130719 | A1 | 5/2012 | Petrovic | |
| 2012/0134548 | A1 | 5/2012 | Rhoads | |
| 2013/0078988 | A1 | 3/2013 | Alex | |
| 2013/0080159 | A1 | 3/2013 | Sharifi | |
| 2013/0150117 | A1 | 6/2013 | Rodriguez | |
| 2015/0016228 | A1 | 1/2015 | Petrovic | |
| 2015/0317989 | A1 | 11/2015 | Mcmillan | |
| 2016/0293172 | A1 | 10/2016 | Sharma | |
| 2017/0131384 | A1 | 5/2017 | Davis | |
| 2018/0144754 | A1 * | 5/2018 | Peng | G10L 19/018 |

OTHER PUBLICATIONS

Aug. 21, 2017 Notice of Allowance and Fees Due; and Jul. 27, 2017 Amendment After Non-Final Rejection; both from U.S. Appl. No. 15/090,279, filed Apr. 4, 2016.

B.Kedem, Spectral analysis and discrimination by zero-crossings, Proceedings of IEEE, vol. 74, No. 11, Nov. 1986.

Boney, Laurence et al., 'Digital watermarks for audio signals', 1996 8TH European Signal Processing Conference (Eusipco 1996), IEEE, ISBN 978-88-86179-83-6, (Sep. 10, 1996), pp. 1-4, (Apr. 8, 2015), XP032770216.

European Search report dated Jul. 3, 2017, in Application No. 16207395.1.

International Search Report and Written Opinion in PCT/US13/65069 dated Apr. 23, 2014.

J.Mauclair, J. Pinquier, Fusion of Descriptors for Speech/Music Classification, Proc. of 12th European Signal Processing Conference (EUSIPCO 2004), Vienna, Austria, Sep. 2004.

Keislar et al., Audio Fingerprints: Technology and Applications, Audio Engineering Society Convention Paper 6215, presented at the 117th Convention 2004, Oct. 28-31, San Francisco, CA.

L.R.Rabiner, M.R.Sambur, Voiced-Unvoiced-Silence Detection using the Itakura LPC Distance Measure, ICASSP 1977.

(56) References Cited

OTHER PUBLICATIONS

M.J. Carey, E.S. Parris, and H. Lloyd-Thomas, A comparison of features for speech, music discrimination. Proceedings of IEEE ICASSP'99. Phoenix, USA, pp. 1432-1435, 1999.
U.S. Appl. No. 15/220,209, filed Jul. 26, 2016.
W Bender, D Gruhl, N Morimoto, A Lu, Techniques for data hiding, IBM Systems Journal, vol. 35, Nos. 3&4, 313-336 1996.
Wold et al., 'Content-Based Classification, Search and Retrieval of Audio,' IEEE MultiMedia 1996.

* cited by examiner

MULTI-MODE AUDIO RECOGNITION AND AUXILIARY DATA ENCODING AND DECODING

RELATED APPLICATION DATA

This application is a continuation of U.S. application Ser. No. 16/751,629, filed Jan. 24, 2020 (U.S. Pat. No. 11,183,198), which is a continuation of U.S. application Ser. No. 15/848,339, filed Dec. 20, 2017 (now U.S. Pat. No. 10,546,590), which is a Continuation of application Ser. No. 15/090,279, filed Apr. 4, 2016 (now U.S. Pat. No. 9,852,736), which is a Continuation of application Ser. No. 14/054,492, filed Oct. 15, 2013 (now U.S. Pat. No. 9,305,559), which is a Continuation-in-Part of application Ser. No. 13/841,727, filed Mar. 15, 2013 (now U.S. Pat. No. 9,401,153), which claims the benefit of U.S. Provisional Application No. 61/714,019, filed Oct. 15, 2012, which are all hereby incorporated by reference.

TECHNICAL FIELD

The invention relates to audio signal processing for signal classification, recognition and encoding/decoding auxiliary data channels in audio.

BACKGROUND AND SUMMARY

The field of audio signal classification is well developed and has many commercial applications. Audio classifiers are used to recognize or discriminate among different types of sounds. Classifiers are used to organize sounds in a database based on common attributes, and to recognize types of sounds in audio scenes. Classifiers are used to pre-process audio so that certain desired sounds are distinguished from other sounds, enabling the distinguished sounds to be extracted and processed further. Examples include distinguishing a voice among background noise, for improving communication over a network, or for performing speech recognition.

Additionally, there are various forms of audio signal recognition and identification in commercial use. Particular examples include audio watermarking and audio fingerprinting. Audio watermarking is a signal processing field encompassing techniques for embedding and then detecting that embedded data in audio signals. The embedded data serves as an auxiliary data channel within the audio. This auxiliary channel can be used for many applications, and has the benefit of not requiring a separate channel outside the audio information.

Audio fingerprinting is another signal processing field encompassing techniques for content based identification or classification. This form of signal processing includes an enrollment process and a recognition process. Enrollment is the process of entering a reference feature set or sets (e.g., sound fingerprints) for a sound into a database along with metadata for the sound. Recognition is the process of computing features and then querying the database to find corresponding features. Feature sets can be used to organize similar sounds based on a clustering of similar features. They can also provide more granular recognition, such as identifying a particular song or audio track of an audio visual program, by matching the feature set with a corresponding reference feature set of a particular song or program. Of course, with such systems, there is a potential for false positive or false negative recognition, which is caused by variety of factors. Systems are designed with trade-offs of accuracy, speed, database size and scalability, etc. in mind.

This document describes a variety of inventions in audio watermarking and audio signal recognition that reach across these fields. The inventions include electronic audio signal processing methods, as well as implementations of these methods in devices, such as computers (including various computer configurations in mobile devices like mobile phones or tablet PCs).

One category of invention is the use of audio classifiers to optimize audio watermark embedding and detecting. For example, audio classifiers are used to determine the type of audio in an audio segment. Based on the audio type, the watermark embedder is adapted to optimize the insertion of a watermark signal in terms of audio perceptual quality, watermark robustness, or watermark data capacity. The watermark embedder is adapted by selecting a configuration of watermark type, perceptual model, watermark protocol and insertion function that is best suited for the audio type. In some embodiments, the classifier determines noise or other types of distortion that are present in the incoming audio signal ("detected noise"), or that are anticipated to be incurred by the watermarked audio after it is distributed ("anticipated noise"). These detected and anticipated noise types are used in selecting the configurations of the watermark embedder. Similar classifiers are used in the detector to provide an efficient means to predict the watermark embedding that has been applied, as well as detected noise in the signal for noise mitigation in the watermark detector. Alternatively or additionally, the watermark may convey information about the variable watermark protocol in a component of the watermark signal.

Another category of invention is watermark signal design, which provides a variety of different watermarking embedding methods, each of which can be adapted for the application or audio type. These watermark signal designs employ novel modulations schemes, support variable protocols, and operate in conjunction with novel perceptual modeling techniques. They also, in some implementations, are integrated with audio fingerprinting.

Other categories of invention are novel watermark embedder and detector processing flows and modular designs enabling adaptive configuration of the embedder and detector. These categories include inventions where objective quality metrics are integrated to simulate subjective quality evaluation, and robustness evaluation is used to tune the insertion of the watermark. Various embedding techniques are described that take advantage of perceptual audio features (e.g., harmonics) or data modulation or insertion methods (e.g., reversing polarity, pairwise and pairwise informed embedding, OFDM watermark designs).

Another category of invention is detector design. Examples include rake receiver configurations to deal with multipath in ambient detection, compensating for time scale modifications, and applying a variety of pre-filters and signal accumulation to increase watermark signal to noise ratio.

Another category of invention is signal pre-conditioning in which an audio signal is evaluated and then adaptively pre-conditioned (e.g., boosted and/or equalized to improve signal content for watermark insertion).

Some of these inventions are recited in claim sets at the end of this document. Further inventions, and various configurations for combining them, are described in more detail in the description that follows. As such, further inventive features will become apparent with reference to the following detailed description and accompanying drawings.

DETAILED DESCRIPTION

Overview of Auxiliary Data Encoding and Decoding Framework

Figure 1:
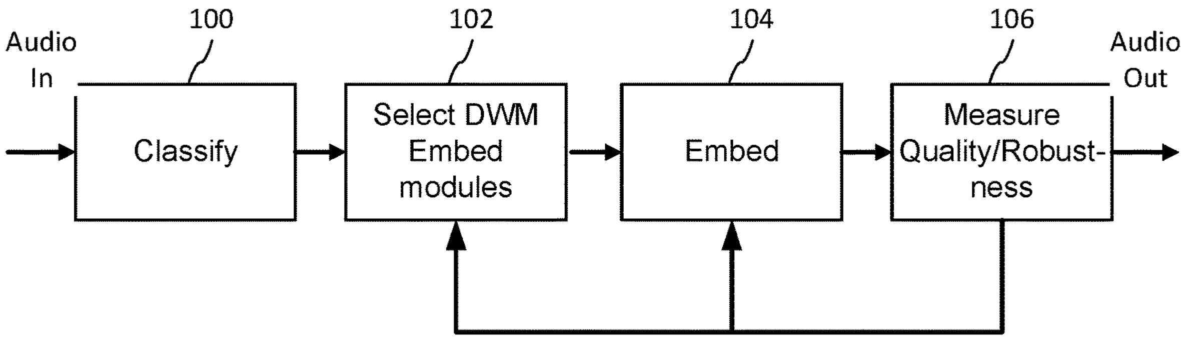
FIG. 1 is a diagram illustrating audio processing for classifying audio and adaptively encoding data in the audio.

FIG. 1 is a diagram illustrating audio processing for classifying audio and adaptively encoding data in the audio. A process (100) for classifying an audio signal receives an audio signal and spawns one or more routines for computing attributes used to characterize the audio, ranging from type of audio content down to identifying a particular song or audio program. The classification is performed on time segments of audio, and segments or features within segments are annotated with metadata that describes the corresponding segments or features.

This process of classifying the audio anticipates that it can encounter a range of different types of audio, including human speech, various genres of music, and programs with a mixture of both as well as background sound. To address this in the most efficient manner, the process spawns classifiers that determine characteristics at different levels of semantic detail. If more detailed classification can be achieved, such as through a content fingerprint match for a song, then other classifier processes seeking less detail can be aborted, as the detailed metadata associated with the fingerprint is sufficient to adapt watermark embedding. A variety of process scheduling schemes can be employed to manage the consumption of processing resources for classification, and we detail a few examples below.

Based on this classification, a pre-process (102) for digital watermark embedding selects corresponding digital watermark embedding modules that are best suited for the audio and the application of the digital watermark. The digital watermark application has requirements for digital data throughput (auxiliary data capacity), robustness, quality, false positive rate, detection speed and computational requirements. These requirements are best satisfied by selecting a configuration of embedding modules for the audio classification to optimize the embedding for the application requirements.

The selected configuration of embedding operations (104) embeds auxiliary data within a segment of the audio signal. In some applications, these operations are performed iteratively with the objective of optimizing embedding of auxiliary data as a function of audio quality, robustness, and data capacity parameters for the application. Iterative processing is illustrated in FIG. 1 as a feedback loop where the audio quality of and/or robustness of data embedded in an audio segment are measured (106) and the embedding module selection and/or embedding parameters of the selected modules are updated to achieve improved quality or robustness metrics. In this context, audio quality refers to the perceptual quality of audio resulting from embedding the digital watermark in the original audio. The original audio can serve as a reference signal against which the perceptual audio quality of the watermarked audio signal is measured.

The metrics for perceptual quality are preferably set within the context of the usage scenario. Expectations for perceptual quality vary greatly depending on the typical audio quality within a particular usage scenario (e.g., in-home listening has a higher expectation of quality than in-car listening or audio within public venues, like shopping centers, restaurants and other public places with considerable background noise). As noted above, classifiers determine noise and anticipated noise expected to be incurred for a particular usage scenario. The watermark parameters are selected to tailor the watermark to be inaudible, yet detectable given the noise present or anticipated in the audio signal. Watermark embedders for inserting watermarks in live audio at concerts and other performances, for example, can take advantage of crowd noise to configure the watermark so as to be masked within that crowd noise. In some configurations, multiple audio streams are captured from a venue using separate microphones at different positions within the venue. These streams are analyzed to distinguish sound sources, such as crowd noise relative to a musical performance, or speech, for example.

Figure 2:
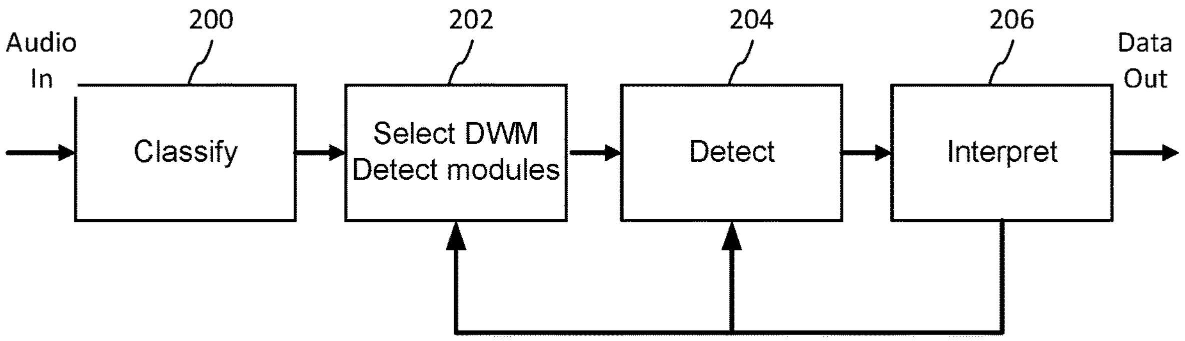
FIG. 2 is a diagram illustrating audio processing for classifying audio and adaptively decoding data embedded in the audio.

FIG. 2 is a diagram illustrating audio processing for classifying audio and adaptively decoding data embedded in the audio. Generally, the objective of an auxiliary data decoder is to extract embedded data as quickly and efficiently as possible. While it is not always necessary to pre-classify audio before decoding embedded data, pre-classifying the audio improves data decoding, particularly in cases where adaptive encoding has been used to optimize an embedding method for the audio type, or where the audio has the possibility of containing one or more layers of distinct audio watermark types. In applications where the watermark is used to initiate a function or set of functions for a user or automated process immediately at point of capture, the classifier has to be a lightweight process that balances decoding speed and accuracy with processing resource constraints. This is particularly true for decoding embedded data from ambient audio captured in portable devices, where greater scarcity of processing resources, and in particularly battery life, present more significant limits on the amount of processing that can allocated to signal classification and data decoding.

With such constraints as guideposts for implementation, the process for classifying the audio (200) for decoding is typically (but not necessarily) a lighter weight process than a classifier used for embedding. In some cases like real time encoding and off-line detection, the pre-classifier of the detector can employ greater computational resources than the pre-classifier of the embedder. Nevertheless, its function and processing flow can emulate the classifier in the embedder, with particular focus on progressing rapidly toward decoding, once sufficient clues as to the type of embedded data, and/or environment in which the audio has been detected, have been ascertained. One advantage in the decoder is that, once audio has been encountered at the embedding stage, a portion of the embedded data can be used to identify embedding type, and the fingerprints of corresponding segments of audio can also be registered in a fingerprint database, along with descriptors of audio signal characteristics useful in selecting a configuration of watermark detecting modules.

Based on signal characteristics ascertained from classifiers, a pre-processor of the decoding process selects DWM detection modules (202). These modules are launched as appropriate to detect embedded data (204). The process of interpreting the detected data (206) includes functions such as error detection, message validation, version identification, error correction, and packaging the data into usable data formats for downstream processing of the watermark data channel.

Audio Classifier as a Pre-Process to Auxiliary Data Encoding and Decoding

Figure 3:
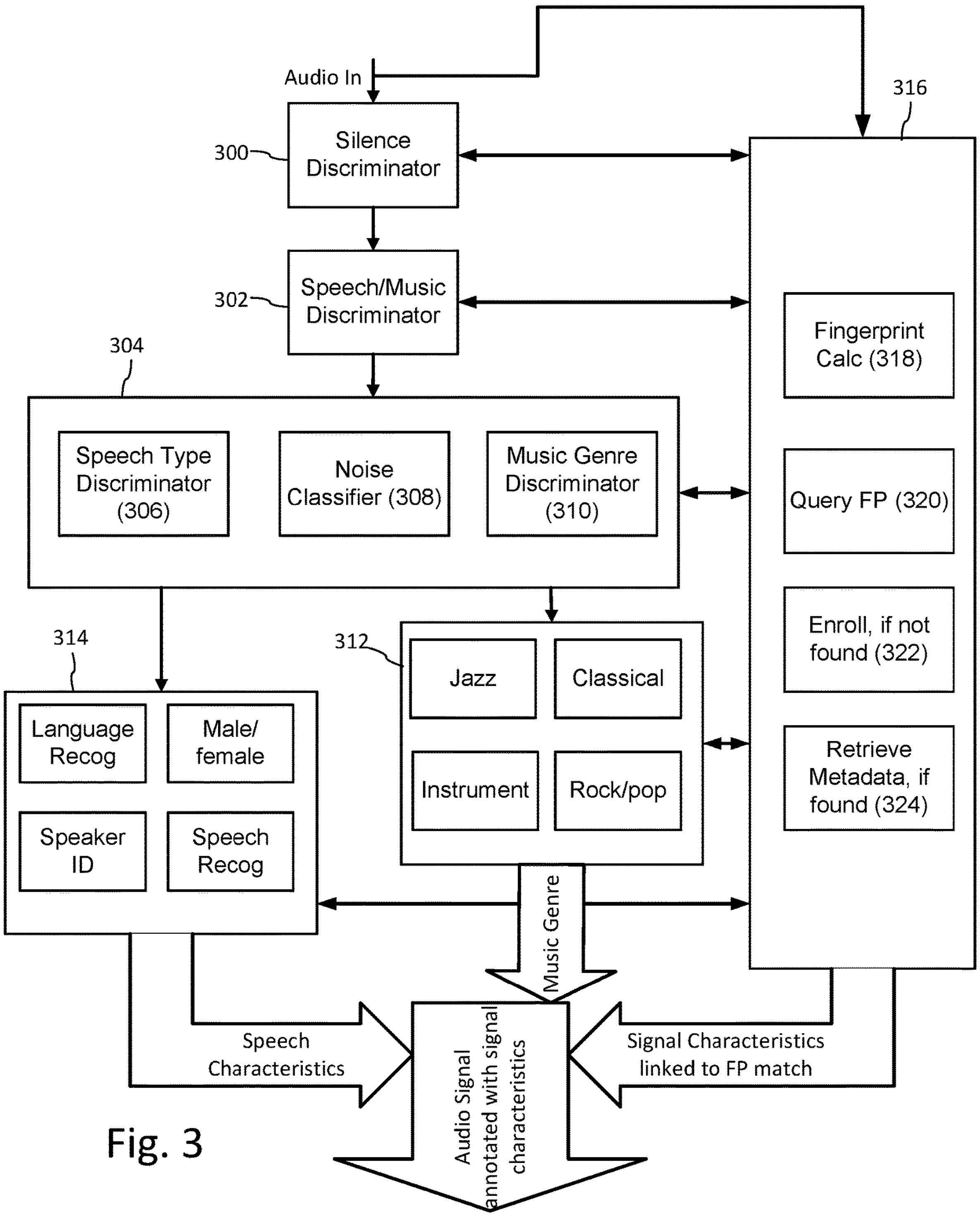
FIG. 3 is a diagram illustrating an example configuration of a multi-stage audio classifier for preliminary analysis of audio for auxiliary data encoding and decoding.

FIG. 3 is a diagram illustrating an example configuration of a multi-stage audio classifier for preliminary analysis of audio for auxiliary data encoding and decoding. We refer to this classifier as "multi-stage" to reflect that it encompasses both sequential (e.g., 300-304) and concurrent execution of classifiers (e.g., fingerprint classifier 316 executes in parallel with silence/speech/music discriminators 300-304).

Sequential or serial execution is designed to provide an efficient preliminary classification that is useful for subsequent stages, and may even obviate the need for certain stages. Further, serial execution enables stages to be organized into a sequential pipeline of processing stages for a buffered audio segment of an incoming live audio stream. For each buffered audio segment, the classifier spawns a pipeline of processing stages (e.g., processing pipeline of stages 300-304).

Concurrent execution is designed to leverage parallel processing capability. This enables the classifier to exploit data level parallelism, and functional parallelism. Data level parallelism is where the classifier operates concurrently on different parts of the incoming signal (e.g., each buffered audio segment can be independently processed, and is concurrently processed when audio data is available for two or more audio segments). Functional parallelism is where the classifier performs different functions in parallel (e.g., silence/speech/music discrimination 300-304 and fingerprint classification 316).

Both data level and functional level parallelism can be used at the same time, such as the case where there are multiple threads of pipeline processing being performed on incoming audio segments. These types or parallelism are supported in operating systems, through support for multi-threaded execution of software routines, and parallel computing architectures, through multi-processor machines and distributed network computing. In the latter case, cloud computing affords not only parallel processing of cloud services across virtual machines within the cloud, but also distribution of processing between a user's client device (such as mobile phone or tablet computer) and processing units in the cloud.

As we explain the flow of audio processing in FIG. 3, we will highlight examples of exploiting these forms of parallelism. At the implementation level of detail, one can create application programs that act as explicit resource managers to control multi-process execution of classifiers, and/or utilize the multi-process capability of the operating system or cloud computing service. The assignee's work on resource management for content recognition in an intuitive computing platform provides helpful background in this field. See, for example, US Patent Publications 20110161076 and 20120134548, and provisional application 61/542,737, filed Oct. 3, 2011 (now published in US Patent Publication 20130150117), which are hereby incorporated by reference in their entirety.

As noted, classifiers can be used in various combinations, and they are not limited to classifiers that rely solely on audio signal analysis. Other contextual or environmental information accessible to the classifier may be used to classify an audio signal, in addition to classifiers that analyze the audio signal itself.

One such example is to analyze the accompanying video signal to predict characteristics of the audio signal in an audiovisual work, such as a TV show or movie. The classification of the audio signal is informed by metadata (explicit or derived) from associated content, such as the associated video. Video that has a lot of action or many cuts indicates a class of audio that is high energy. In contrast, video with traditional back and forth scene changes with only a few dominate faces indicates a class of speech. Some audiovisual content has associated closed caption information in a metadata channel from which additional descriptors of the audio signal are derived to predict audio type at points in time in the audio signal that correspond to closed caption information, indicating speech, silence, music, speakers, etc. Thus, audio class can be predicted, at least initially, from a combination of detection of video scene changes, and scene activity, detection of dominant faces, and closed caption information, which adds further confidence to the prediction of audio class.

A related category of classifiers is those that derive contextual information about the audio signal by determining other audio transformations that have been applied to it. One way to determine these processes is to analyze metadata attached to the audio signal by audio processing equipment, which directly identifies an audio pre-process such as compression or band limiting or filtering, or infers it based on audio channel descriptors. For example, audio and audiovisual distribution and broadcast equipment attaches metadata, such as metadata descriptors in an MPEG stream or like digital data stream formats, ISAN, ISRC or like industry standard codes, radio broadcast pre-processing effects (e.g., Orban processing, and like pre-processing of audio used in AM and FM radio broadcasts).

Some broadcasters pre-process audio to convey a mood or energy level. A classifier may be designed to deduce the audio signature of this pre-processing from audio features (such as its spectral content indicating adjustments made to the frequency spectrum). Alternatively, the preprocessor may attach a descriptor tag identifying that such pre-processing has been applied through a metadata channel from the pre-processor to the classifier in the watermark embedder.

Another way to determine context is to deduce attributes of the audio from the channel that the audio is received. Certain channels imply standard forms of data coding and compression, frequency range, bandwidth. Thus, identification of the channel identifies the audio attributes associated with the channel coding applied in that channel.

Context may also be determined for audio or audiovisual content from a playlist controller or scheduler that is used to prepare content for broadcast. One such example is a scheduler and associated database providing music metadata for broadcast of content via radio or internet channels. One example of such scheduler is the RCS Selector. The classifier can query the database periodically to retrieve metadata for audio signals, and correlate it to the signal via time of broadcast, broadcast identifier and/or other contextual descriptors.

Likewise, additional contextual clues about the audio signal can be derived from GPS and other location information associated with it. This information can be used to ascertain information about the source of the audio, such as local language types, ambient noise in the environment where the audio is produced or captured and watermarked (e.g., public venues), typical audio coding techniques used in the location, etc.

The classifier may be implemented in a device such as a mobile device (e.g., smart phone, tablet), or system with access to sensor inputs from which contextual information about the audio signal may be derived. Motion sensors and orientation sensors provide input indicating conditions in which the audio signal has been captured or output in a mobile device, such as the position and orientation, velocity and acceleration of the device at the time of audio capture or audio output. Such sensors are now typically implemented in MEMS sensors within mobile devices and the motion data made available via the mobile device operating system. Motion sensors, including a gyroscope, accelerometer, and/or magnetometer provide motion parameters which add to the contextual information known about the environment in which the audio is played or captured.

Surrounding RF signals, such as Wi Fi and BlueTooth signals (e.g., low power BlueTooth beacons, like iBeacons from Apple, Inc.) provide additional contextual information about the audio signal. In particular, data associated with Wi Fi access points, neighboring devices and associated user IDs with these devices, provides clues about the audio environment at a site. For example, the audio characteristics of a particular site may be stored in a database entry associated with a particular location or network access point. This information in the database can be updated over time, based on data sensed from devices at the location. For example, crowd sourcing or war driving modalities may be used to poll data from devices within range of an access point or other RF signaling device, to gather context information about audio conditions at the site. The classifier accesses this database to get the latest audio profile information about a particular site, and uses this profile to adapt audio processing, such as embedding, recognition, etc.

The classifier may be implemented in a distributed arrangement, in which it collects data from sensors and other classifiers distributed among other devices. This distributed arrangement enables a classifier system to fetch contextual information and audio attributes from devices with sensors at or around where the watermarked audio is produced or captured. This enables sensor arrays to be utilized from sensors in nearby devices with a network connection to the classifier system. It also enables classifiers executing on other devices to share their classifications of the audio with other audio classifiers (including audio fingerprinting systems), and watermark embedding or decoding systems.

Building on the concept of leveraging plural sensors, classifiers that have access to audio input streams from microphones perform multiple stream analysis. This may include multiple microphones on a device, such as a smartphone, or a configuration of microphones arranged around a room or larger venue to enable further audio source analysis. This type of analysis is based on the observation that the input audio stream is a combination of sounds from different sound sources. In one approach, Independent Component Analysis (ICA) is used to un-mix the sounds. This approach seeks to find a un-mix matrix that maximizes a statistical property, such as, kurtosis. The un-mix matrix that maximizes kurtosis separates the input into estimates of independent sound sources. These estimates of sound sources can be used advantageously for several different classifier applications. Separated sounds may be input to subsequent classifier stages for further classification by sound source, including audio fingerprint-based recognition. For watermark embedding, this enables the classifier to separately classify different sounds that are combined in the input audio and adapt embedding for one or more of these sounds. For detecting, this enables the classifier to separate sounds so that subsequent watermark detection or filtering may be performed on the separate sounds.

Multiple stream analysis enables different watermark layers to be separated from input audio, particularly if those layers are designed to have distinct kurtosis properties that facilitates un-mixing. It also allows separation of certain types of big noise sources from music or speech. It also allows separation of different musical pieces or separate speech sources. In these cases, these estimated sound sources may be analyzed separately, in preparation for separate watermark embedding or detecting. Unwanted portions can be ignored or filtered out from watermark processing. One example is filtering out noise sources, or conversely, discriminating noise sources so that they can be adapted to carry watermark signals (and possible unique watermark layers per sound source). Another is inserting different watermarks in different sounds that have been separated by this process, or concentrating watermark signal energy in one of the sounds. For example, in the embedding of watermarks in live performances, the watermark can be concentrated in a crowd noise sound, or in a particular musical component of the performance. After such processing, the separate sounds may be recombined and distributed further or output. One example is near real time embedding of the audio in mixing equipment at a live performance or public venue, which enables real time data communication in the recordings captured by attendees at the event.

Multiple stream analysis may be used in conjunction with audio localization using separately watermarked streams from different sources. In this application, the separately watermarked streams are sensed by a microphone array. The sensed input is then processed to distinguish the separate watermarks, which are used to ascertain location as described in US Patent Publications 20120214544 and 20120214515, which are hereby incorporated by reference in their entirety. The separate watermarks are associated with audio sources at known locations, from which position of the receiving mobile device is triangulated. Additionally, detection of distinct watermarks within the received audio of the mobile device enables difference of arrival techniques for determining positioning of that mobile device relative to the sound sources.

This analysis improves the precision of localizing a mobile device relative to sound sources. With greater precision, additional applications are enabled, such as augmented reality as described in these applications and further below. Additional sensor fusion can be leveraged to improve contextual information about the position and orientation of a mobile device by using the motion sensors within that device to provide position, orientation and motion parameters that augment the position information derived from sound sources. The processing of the audio signals provides a first set of positioning information, which is added to a second set of positioning information derived from motion sensors, from which a frame of reference is created to create an augmented reality experience on the mobile device. Mobile device is intended to encompass smart phones, tablets, wearable computers (Google Glass from Google), etc.

As noted, a classifier preferably provides contextual information and attributes of the audio that is further refined in subsequent classifier stages. One example is a watermark detector that extracts information about previously encoded watermarks. A watermark detector also provides information about noise, echoes, and temporal distortion that is computed in attempting to detect and synchronize watermarks in the audio signal, such as Linear Time Shifting (LTS) or Pitch Invariant Time Scaling (PITS). See further details of synchronization and detecting such temporal distortion parameters below.

More generally, classifier output obtained from analysis of an earlier part of an audio stream may be used to predict audio attributes of a later part of the same audio stream. For example, a feedback loop from a classifier provides a prediction of attributes for that classifier and other classifiers operating on later received portions of the same audio stream.

Extending this concept further, classifiers are arranged in a network or state machine arrangement. Classifiers can be arranged to process parts of an audio stream in series or in parallel, with the output feeding a state machine. Each classifier output informs state output. Feedback loops provide state output that informs subsequent classification of subsequent audio input. Each state output may also be weighted by confidence so that subsequent state output can be weighted based on a combination of the relative confidence in current measurements and predictions from earlier measurements. In particular, the state machine of classifiers may be configured as a Kalman filter that provides a prediction of audio type based on current and past classifier measurements.

Just as the PEAQ method (describe further below) is derived based on neural net training on audio test signals, so can the classifier by derived by mapping measured audio features of a training set of audio signals to audio classifications used to control watermark embedding and detecting parameters. This neural net training approach enables classifiers to be tuned for different usage scenarios and audio environments in which watermarked audio is produced and output, or captured and processed for watermark embedding or detecting. The training set is provides signals typical for the intended usage environment. In this fashion, the perceptual quality can be analyzed in the context of audio types and noise sources that are likely to be present in the audio stream being processed for audio classification, recognition, and watermark embedding or detecting.

Microphones arranged in a particular venue, or audio test equipment in particular audio distribution workflow, can be deployed to capture audio training signals, from which a neural net classifier used in that environment is trained. Such neural net trained classifiers may also be designed to detect noise sources and classify them so that the perceptual quality model tuned to particular noise sources may be selected for watermark embedding, or filters may be applied to mitigate noise sources prior to watermark embedding or detecting. This neural net training may be conducted continuously, in an automated fashion, to monitor audio signal conditions in a usage scenario, such as a distribution channel or venue. The mapping of audio features to classifications in the neural net classifier model is then updated over time to adapt based on this ongoing monitoring of audio signals.

In some applications, it is desired to generate several unique audio streams. In particular, an embedder system may seek to generate uniquely watermarked versions of the same audio content for localization. In such a case, uniquely watermarked versions are sent to different speakers or to different groups of speakers as described in US Patent Publications 20120214544 and 20120214515. Another example is real-time or near real time transactional encoding of audio at the point of distribution, where each unique version is associated with a particular transaction, receiver, user, or device. Sophisticated classification in the embedding workflow adds latency to the delivery of the audio streams.

There are several schemes for reducing the latency of audio classification. One scheme is to derive audio classification from environmental (e.g., sensed attributes of the site or venue) and historical data of previously classified audio segments to predict the attributes of the current audio segment in advance, so that the adaptation of the audio can be performed at or near real time at the point of unique encoding and transmission of the uniquely watermarked audio signals. Predicted attributes, such as predicted perceptual modeling parameters, can be updated with a prediction error signal, at the point of modifying the audio signal to create a unique audio stream. The classification applies to all unique streams that are spawned from the input audio, and as such, it need only be performed on the input stream, and then re-used to create each unique audio output. The description of adapting neural net classifiers based on monitoring audio signals applies here as well, as it is another example of predicting classifier parameters based on audio signal measurements over time.

Additionally, certain watermark embedding techniques have higher latency than others, and as such, may be used in configurations where watermarks are inserted at different points in time, and serve different roles. Low latency watermarks are inserted in real time or near real time with a simple or no perceptual modeling process. Higher latency watermarks are pre-embedded prior to generating unique streams. The final audio output includes plural watermark layers. For example, watermarks that require more sophisticated perceptual modeling, or complex frequency transforms, to insert a watermark signal robustly in the human auditory range carry data that is common for the unique audio streams, such as a generic source or content ID, or control instruction, repeated throughout each of the unique audio output streams Conversely, watermarks that can be inserted with lower latency are suitable for real time or near real time embedding, and as such, are useful in generating uniquely watermarked streams for a particular audio input signal. This lower latency is achieved through any number of factors, such as simpler computations, lack of frequency transforms (e.g., time domain processing can avoid such transforms), adaptability to hardware embedding (vs. software embedding with additional latency due to software interrupts between sound card hardware and software processes, etc.), or different trade-offs in perceptibility/payload capacity/robustness, One example is a frequency domain watermark layer in the human auditory range, which has higher embedding latency due to frequency transformations and/or perceptual modeling overhead. It can be used to provide an audio-based strength of signal metric in the detector for localization applications. It can also convey robust message payloads with content identifiers and instructions that are in common across unique streams.

Another example is a time domain watermark layer inserted in real time, or near real time, to provide unique signaling for each stream. These unique streams based on unique watermark signals are assigned to unique sound sources in positioning applications to differentiate sources. Further, our time domain spread spectrum watermark signaling is designed to provide granularity in the precision of the timing of detection, which is useful for determining time of arrival from different sound sources for positioning applications. Such low latency watermarks can also, or alternatively, convey identification unique to a particular copy of the stream for transactional watermarking applications.

Another option for real time insertion is to insert a high frequency watermark layer, which is at the upper boundary or even outside the human auditory range. At this range, perceptual modeling is not needed because humans are unlikely to hear it due to the frequency range at which it is inserted. While such a layer may not be robust to forms of compression, it is suitable for applications where such compression is not in the processing path. For example, a high frequency watermark layer can be added efficiently for real time encoding to create unique streams for positioning applications. Various combinations of the above layers may be employed.

The above examples are not intended to imply that certain frequency or time domain techniques are limited to non-real time or real time embedding, as the processing overhead may be adapted to make them suitable for either role.

These classifier arrangements can be implemented and used in various combinations and applications with the technology described in co-pending application Ser. No. 13/607,095, filed Sep. 7, 2012, entitled CONTEXT-BASED SMARTPHONE SENSOR LOGIC (published as US Publication 20130150117), which is hereby incorporated by reference in its entirety.

Referring to FIG. 3, we turn to an example of a multi-stage classifier. The audio input to the classifier is a digitized stream that is buffered in time segments (e.g., in a digitized electronic audio signal stored in Random Access Memory (RAM)). The time length and time resolution (i.e. sampling rate) of the audio segment vary with application. The audio segment size and time scale is dictated by the needs of the audio processing stages to follow. It is also possible to sub-divide the incoming audio into segments at different sizes and sample rates, each tuned for a particular processing stage.

Initially, the classifier process acts as a high level discriminator of audio type, namely, discriminating among parts of the audio that are comprised of silence, speech or music. A silence discriminator (300) discriminates between background noise and speech or music content, and speech-music discriminator (302) discriminates between speech and music. This level of discrimination can use similar computations, such as energy metrics (sum of squared or absolute amplitudes, rate of change of energy, for a particular time frame, etc.), signal activity metrics (zero crossing rate). As such, the routines for discriminating speech, silence and music may be integrated more tightly together. Alternatively, a frequency domain analysis (i.e. a spectral analysis) could be employed instead of or in addition to time-domain analysis. For example, a relatively flat spectrum with low energy would indicate silence.

Continuing on this theme, block 304 in FIG. 3 includes further levels of discrimination that may be applied to previously discriminated parts. Speech parts, for example, may be further discriminated into female vs. male speech in a speech type discriminator (306).

Discrimination within speech may further invoke classification of voiced and un-voiced speech. Speech is composed of phonemes, which are produced by the vocal cords and the vocal tract (which includes the mouth and the lips). Voiced signals are produced when the vocal cords vibrate during the pronunciation of a phoneme. Unvoiced signals, by contrast, do not entail the use of the vocal cords. For example, the primary difference between the phonemes /s/ and /z/ or /f/ and /v/ is the constriction of air flow in the vocal tract. Voiced signals tend to be louder like the vowels /a/, /e/, /i/, /u/, /o/. Unvoiced signals, on the other hand, tend to be more abrupt like the stop consonants /p/, /t/, /k/. If the watermark signal has noise-like characteristics, it can be hidden more readily (i.e., the watermark can be embedded more strongly) in unvoiced regions (such as in fricatives) than in voiced regions. The voiced/unvoiced classifier can be used to determine the appropriate gain for the watermark signal in these regions of the audio.

Noise sources may also be classified in noise classifier (308). As the audio signal may be subjected to additional noise sources after watermark embedding or fingerprint registration, such a classification may be used to detect and compensate for certain types of noise distortion before further classification or auxiliary data decoding operations are applied to the audio. These types of noise compensation may tend to play a more prominent role in classifiers for watermark data detectors rather than data embedders, where the audio is expected to have less noise distortion.

In ambient watermark detection, classifying background environmental sounds may be beneficial. Examples include wind, road noise, background conversations etc. Once classified, these types of sounds are either filtered out or de-emphasized during watermark detection. Later, we describe several pre-filter options for digital watermark detection.

For audio identified as music, music genre discriminator (310) may be applied to discriminate among classes of music according to genre, or other classification useful in pairing the audio signal with particular data embedding/detecting configurations.

Examples of additional genre classification are illustrated in block 312. For the purpose of adapting watermarking functions, we have found that discrimination among the following genres can provide advantages to later watermarking operations (embedding and/or detecting). For example, certain classical music tends to occupy lower frequency ranges (up to 2 KHz), compared to rock/pop music (occupies most of the available frequency range). With the knowledge of the genre, the watermark signal gain can be adjusted appropriately in different frequency bands. For example, in classical music, the watermark signal energy can be reduced in the higher frequencies.

For some applications, further analysis of speech can also be useful in adapting watermarking or content fingerprint operations. In addition to male/female voice discrimination, such recognition modules (314) may include recognition of a particular language, recognizing a speaker, or speech recognition, for example. Each language, culture or geographic region may have its own perceptual limits as speakers of different languages have trained their ears to be more sensitive to some aspects of audio than others (such the importance of tonality in languages predominantly spoken in southeast Asia). These forms of more detailed semantic recognition provide information from which certain forms of entertainment, informational or advertising content can be inferred. In the encoding process, this enables the type and strength of watermark and corresponding perceptual models to be adapted to content type. In the decoding process, where audio is sensed from an ambient environment, this provides an additional advantage of discriminating whether a user is being exposed to one or more these particular types of content from audio playback equipment as opposed to live events or conversations and typical background noises characteristic of certain types of settings. This detection of environmental conditions, such as noise sources, and different sources of audio signals, provides yet another input to a process for selecting filters that enhance watermark signal relative to other signals, including the original host audio signal in which the watermark signal is embedded and noise sources.

The classifier of FIG. 3 also illustrates integration of content fingerprinting (316). Discrimination of the audio also serves as a pre-process to either calculation of content fingerprints of a segment of audio, to facilitating efficient search of the fingerprint database, or a combination of both. The type of fingerprint calculation (318) for particular music databases can be selected for portions of content that are identified as music, or more specifically a particular music genre, or source of audio. Likewise, selection of fingerprint calculation type and database may be optimized for content that is predominantly speech.

The fingerprint calculator 318 derives audio fingerprints from a buffered audio segment. The fingerprint process 316 then issues a query to a fingerprint database through query interface 320. This type of audio fingerprint processing is fairly well developed, and there are a variety of suppliers of this technology.

If the fingerprint database does not return a match, the fingerprint process 316 may initiate an enrollment process 322 to add fingerprints for the audio to a corresponding database and associate whatever metadata about the audio that is currently available with the fingerprint. For example, if the audio feed to the pre-classifier has some related metadata, like broadcaster ID, program ID, etc. this can be associated with the fingerprint at this stage. Additional metadata keyed on these initial IDs can be added later. Additionally, metadata generated about audio attributes by the classifier may be added to the metadata database.

In cases where the fingerprint processing provides an identification of a song or program, the signal characteristics for that song or program may then be retrieved for informed data encoding or decoding operations. This signal characteristic data is provided from a metadata database to a metadata interface 324 in the classifier.

Audio fingerprinting is closely related to the field of audio classification, audio content based search and retrieval. Modern audio fingerprint technologies have been developed to match one or more fingerprints from and audio clip to reference fingerprints for audio clips in a database with the goal of identifying the audio clip. A fingerprint is typically generated from a vector of audio features extracted from an audio clip. More generally, audio types can be classified into more general classifications, like speech, music genre, etc. using a similar approach of extracting feature vectors and determining similarity of the vectors with those of sounds in a particular audio class, such as speech or musical genre. Salient audio features used by humans to distinguish sounds typically are pitch, loudness, duration and timbre. Computer based methods for classification compute feature vectors comprised of objectively measurable quantities that model perceptually relevant features. For a discussion of audio content based classification, search and retrieval, see for example, Wold, E., Blum, T., Keislar, D., and Wheaton, J., "Content-Based Classification, Search, and Retrieval of Audio," IEEE Multimedia Magazine, Fall 1996, and U.S. Pat. No. 5,918,223, which are hereby incorporated by reference. For a discussion of fingerprinting, see, Audio Fingerprints: Technology and Applications, Keislar et al., Audio Engineering Society Convention Paper 6215, presented at the 117$^{th}$ Convention 2004, October 28-31, San Francisco, CA.

As noted in Wold and Keislar, audio features can also be used as to identify different events, such as transitions from one sound type to another, or anchor points. Events are identified by calculating features in the audio signal over time, and detecting sudden changes in the feature values. This event detection is used to segment the audio signal into segments comprising different audio types, where events denote segment boundaries. Audio features can also be used to identify anchor points (also referred to as landmarks in some fingerprint implementations), Anchor points are points in time that serve as a reference for performing audio analysis, such as computing a fingerprint, or embedding/decoding a watermark. The point in time is determined based on a distinctive audio feature, such as a strong spectral peak, or sudden change in feature value. Events and anchor points are not mutually exclusive. They can be used to denote points or features at which watermark encoding/decoding should be applied (e.g., provide segmentation for adapting the embedding configuration to a segment, and/or provide reference points for synchronizing watermark decoding (providing a reference for watermark tile boundaries or watermark frames) and identifying changes that indicate a change in watermark protocol adapted to the audio type of a new segment detected based on the anchor point or audio event.

Audio classifiers for determining audio type are constructed by computing features of audio clips in a training data set and deriving a mapping of the features to a particular audio type. For the purpose of digital watermarking operations, we seek classifications that enable selection of audio watermark parameters that best fit the audio type in terms of achieving the objectives of the application for audio quality (imperceptibility of the audio modifications made to embed the watermark), watermark robustness, and watermark data capacity per time segment of audio. Each of these watermark embedding constraints is related to the masking capability of the host audio, which indicates how much signal can be embedded in a particular audio segment. The perceptual masking models used to exploit the masking properties of the host audio to hide different types of watermark are computed from host audio features. Thus, these same features are candidates for determining audio classes, and thus, the corresponding watermark type and perceptual models to be used for that audio class. Below, we describe watermark types and corresponding perceptual models in more detail.

Adaptation of Auxiliary Data Encoding Based on Audio Classification

Figure 4:
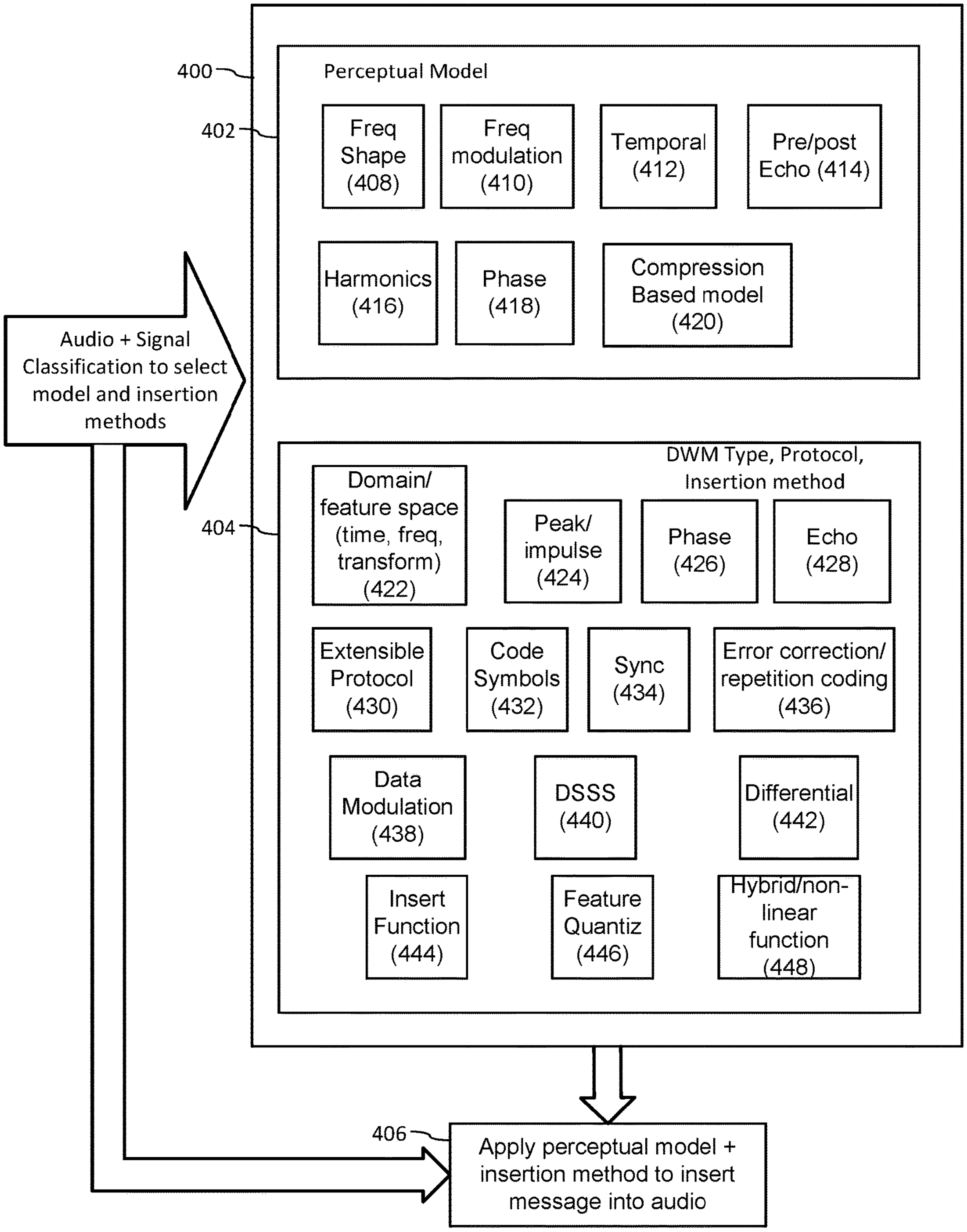
FIG. 4 is a diagram illustrating selection of perceptual modeling and digital watermarking modules based on audio classification.

FIG. 4 is a diagram illustrating selection of perceptual modeling and digital watermarking modules based on audio classification. The process of embedding the digital watermark includes signal construction to transform auxiliary data into the watermark signal that is inserted into a time segment of audio and perceptual modeling to optimize watermark signal insertion into the host audio signal. The process of constructing the watermark signal is dependent on the watermark type and protocol. Preferably, the perceptual modeling is associated with a compatible insertion method, which in turn, employs a compatible watermark type and protocol, together forming a configuration of modules adapted to the audio classification. As shown in FIG. 4, the classification of the audio signal allows the embedder to select an insertion method and associated perceptual model that are best suited for the type of audio. Suitability is defined in terms of embedding parameters, such as audio quality, watermark robustness and auxiliary data capacity.

FIG. 4 depicts a watermark controller interface 400 that receives the audio signal classification and selects a set of compatible watermark embedding modules. The interface selects a variable configuration of perceptual models, digital watermark (DWM) type(s), watermark protocols and insertion method for the audio classification. The interface selects one or more perceptual model analysis modules from a library 402 of such modules (e.g., 408-420). The choice of the perceptual model can change for different portions or frames of an audio signal depending upon the classification results and the characteristics of that portion. These modules are paired with modules in a library of insertion methods 404. A selected configuration of insertion methods forms a watermark embedder 406.

The embedder 406 takes a selected watermark type and protocol for the audio class and constructs the watermark signal of this selected type from auxiliary data. As depicted in FIG. 4, the watermark type specifies a domain or "feature space" (422) in which the watermark signal is defined, along with the watermark signal structure and audio feature or features that are modified to convey the watermark. Examples of features include the amplitude or magnitude of discrete values in the feature space, such as amplitudes of discrete samples of the audio in a time domain, or magnitudes of transform domain coefficients in a transform domain of the audio signal. Additional examples of features include peaks or impulse functions (424), phase component adjustments (426), or other audio attributes, like an echo (428). From these examples, it is apparent that they can be represented in different domains. For instance, a frequency domain peak corresponds to a time domain sinusoid function. An echo corresponds to a peak in the autocorrelation domain. Phase, likewise has a representation of a time shift in the time domain, phase angle in a frequency domain. The watermark signal structure defines the structure of feature changes made to insert the watermark signal: e.g., signal patterns such as changes to insert a peak or collection of peaks, a set of amplitude changes, a collection of phase shifts or echoes, etc.

The embedder constructs the watermark signal from auxiliary data according to a signal protocol. FIG. 4 shows an "extensible" protocol (430), which refers to a variable protocol that enables different watermark protocols to be selected, and identified by the watermark using version identifiers. For background on extensible protocols, please see U.S. Pat. No. 7,412,072, which is hereby incorporated by reference in its entirety. The protocol specifies how to construct the watermark signal and can include a specification of data code symbols (432), synchronization codes or signals (434), error correction/repetition coding (436), and error detection coding.

The protocol also provides a method of data modulation (438). Data modulation modulates auxiliary data (e.g., an error correction encoded transformation of such data) onto a carrier signal. One example is direct sequence spread spectrum modulation (440). There are a variety of data modulation methods that may be applied, including different modulation on components of the watermark, as well as a sequence of modulation on the same watermark. Additional examples include frequency modulation, phase modulation, amplitude modulation, etc. An example of a sequence of modulation is to apply spread spectrum modulation to spread error corrected data symbols onto spread spectrum carrier signals, and then apply another form of modulation, like frequency or phase modulation to modulate the spread spectrum signal onto frequency or phase carrier signals.

The version of the watermark may be conveyed in an attribute of the watermark. This enables the protocol to vary, while providing an efficient means for the detector to handle variable watermark protocols. The protocol can vary over different frames, or over different updates of the watermarking system, for example. By conveying the version in the watermark, the watermark detector is able to identify the protocol quickly, and adapt detection operations accordingly. The watermark may convey the protocol through a version identifier conveyed in the watermark payload. It may also convey it through other watermark attributes, such as a carrier signal or synch signal. One approach is to use orthogonal Hadamard codes for version information.

The embedder builds the watermark from components, such as fixed data, variable data and synchronization components. The data components are input to error correction or repetition coding. Some of the components may be applied to one or more stages of data modulators.

The resulting signal from this coding process is mapped to features of the host signal. The mapping pattern can be random, pairwise, pairwise antipodal (i.e. reversing in polarity), or some combination thereof. The embedder modules of FIG. 4 include a differential encoder protocol (442). The differential encoder applies a positive watermark signal to one mapping of features, and a negative watermark signal to another mapping. Differential encoding can be performed on adjacent features, adjacent frames of features, or to some other pairing of features, such as a pseudorandom mapping of the watermark signals to pairs of host signal features.

After constructing the watermark signal, the embedder applies the perceptual model and insertion function (444) to embed the watermark signal conveying the auxiliary data into the audio. The insertion function (444) uses the output of the perceptual model, such as a perceptual mask, to control the modification of corresponding features of the host signal according to the watermark signal elements mapped to those features. The insertion function may, for example, quantize (446) a feature of the host signal corresponding to a watermark signal element to encode that element, or make some other modification (linear or non-linear function (448) of the watermark signal and perceptual mask values for the corresponding host features).

Introduction to Watermark Type

As we will explain, there are a variety of ways to define watermark type, but perhaps the most useful approach to defining it is from the perspective of detecting the watermark signal. To be detectable, the watermark signal must have a recognizable structure within the host signal in which it is embedded. This structure is manifested in changes made to features of the host signal that carry elements of the watermark signal. The function of the detector is to discern these signal elements in features of the host signal and aggregate them to determine whether together, they form the structure of a watermark signal. Portions of the audio that do have such recognizable structure are further processed to decode and check message symbols.

The watermark structure and host signal features that convey it are important to the robustness of the watermark. Robustness refers to the ability of the watermark to survive signal distortion and the associated detector to recover the watermark signal despite this distortion that alters the signal after data is embedded into it. Initial steps of watermark detection serve the function of detecting presence, and temporal location and synchronization of the embedded watermark signal. For some watermark types and applications where signal distortion, such as time scaling, may have an impact, the signal is designed to be robust to such distortion, or is designed to facilitate distortion estimation and compensation. Subsequent steps of watermark detection serve the function of decoding and checking message symbols. To meet desired robustness requirements, the watermark signal must have a structure that is detectable based on signal elements encoded in relatively robust audio features. There is a relationship among the audio features, watermark structure and detection processing that allows for one of these to compensate for or take advantages of the strengths or weaknesses, of the others.

Having introduced the concepts of watermark structure and audio features for conveying it, one can now appreciate finer aspects in watermark design and insertion methodology. The watermark structure is inserted into audio by altering audio features according to watermark signal elements that make up the structure. Watermarking algorithms are often classified in terms of signal domains, namely signal domains where the signal is embedded or detected, such as "time domain," "frequency domain," "transform domain," "echo or autocorrelation" domain. For discrete audio signal processing, these signal domains are essentially a vector of audio features corresponding to units for an audio frame: e.g., audio amplitude at a discrete time values within a frame, frequency magnitude for a frequency within a frequency transform of a frame, phase for a frequency transform of a frame, echo delay pattern or auto-correlation feature within a frame, etc. For background, see watermarking types in U.S. Pat. Nos. 6,614,914 and 6,674,876, and Published Applications 20120214515 and 20120214544, which are hereby incorporated by reference. The domain of the signal is essentially a way of referring to the audio features that carry watermark signal elements, and likewise, a coordinate space of such features where one can define watermark structure.

While we believe that defining the watermark type from the perspective of the detector is most useful, one can see that there are other useful perspectives. Another perspective of watermark type is that of the embedder. While it is common to embed and detect a watermark in the same feature set, it is possible to represent a watermarks signal in different domains for embedding and detecting, and even different domains for processing stages within the embedding and detecting processes themselves. Indeed, as watermarking methods become more sophisticated, it is increasingly important to address watermark design in terms of many different feature spaces. In particular, optimizing watermarking for the design constraints of audio quality, watermark robustness and capacity dictate watermark design based an analysis in different feature spaces of the audio.

A related consideration that plays a role in watermark design is that well-developed implementations of signal transforms enable a discrete watermark signal, as well as sampled version of the host audio, to be represented in different domains. For example, time domain signals can be transformed into a variety of transform domains and back again (at least to some close approximation). These techniques, for example, allow a watermark that is detected based on analysis of frequency domain features to be embedded in the time domain. These techniques also allow sophisticated watermarks that have time, frequency and phase components. Further, the embedding and detecting of such components can include analysis of the host signal in each of these feature spaces, or in a subset of the feature space, by exploiting equivalence of the signal in different domains.

Introduction to Perceptual Modeling

Building on this more sophisticated perspective, our preferred approach to perceptual modeling dictates a design that accounts for impacts on audibility introduced by insertion of the watermark and related human auditory masking effects to hide those impacts. Auditory masking theory classifies masking in terms of the frequency domain and the time domain Frequency domain masking is also known as simultaneous masking or spectral masking. Time domain masking is also called temporal masking or non-simultaneous masking. Auditory masking is often used to determine the extent to which audio data can be removed (e.g., the quantization of audio features) in lossy audio compression methods. In the case of watermarking, the objective is to insert an auxiliary signal into host audio that is preferably masked by the audio. Thus, while masking thresholds used for compression of audio could be used for masking watermarks, it is sometimes preferred to use masking thresholds that are particularly tailored to mask the inserted signal, as opposed to masking thresholds designed to mask artifacts from compression. One implication is that narrower masking curves than those for compression are more appropriate for certain types of watermark signals. We provide additional details on masking models for watermarking below.

There are also other types of masking effects, which are not necessarily distinct from these classes of masking, which apply for certain types of host signal maskers and watermark signal types. For example, masking is also sometimes viewed in terms of the frequency tone-like or noise like nature of the masker and watermark signal (e.g., tone masking anther tone, noise masking other noise, tone masking noise, and noise masking tone). Masking models leverage these effects by detecting tone-like or noise-like properties of the masker, and determining the masking ability of such a masker to mask a tone-like or noise-like watermark signal.

The perceptual model measures a variety of audio characteristics of a sound and based on these characteristics, determines a masking envelope in which a watermark signal of particular type can be inserted without causing objectionable audio artifacts. The strength, duration and frequency of a sound are inputs of the perceptual model that provide a masking envelope, e.g., in time and/or frequency, that controls the strength of the watermark signal to stay within the masking envelope.

Varying sound strength of the host audio can also affect its ability to mask a watermark signal. Loudness is a subjective measure of strength of a sound to a human listener in which the sound is ordered on a scale from quiet to loud. Objective measures of sound strength include sound pressure, sound pressure level (in decibels), sound intensity or sound power. Loudness is affected by parameters including sound pressure, frequency, bandwidth and duration. The human auditory system integrates the effects of sound pressure level over a 600-1000 ms window. Loudness for a constant SPL will be perceived to increase in loudness with increasing duration, up to about 1 second, at which time the perception of loudness stabilizes. The sensitivity of the human ear also changes as function of frequency, as represented in equal loudness graphs. Equal loudness graphs provide SPLs required for sounds at different frequencies to be perceived as equally loud.

In the perceptual model for a particular type of watermark, measurement of sound strength at different frequencies can be used in conjunction with equal loudness graphs to adjust the strength of the watermark signal relative to the host sound strength. This provides another aspect of spectral shaping of the watermark signal strength. Duration of a particular sound can also be used in the temporal shaping of the watermark signal strength to form a masking envelope around the sound where the watermark signal can be increased, yet still masked.

Another example of a perceptual model for watermark insertion is the observation that certain types of audio effect insertion is not perceived to be objectionable, either because the host audio masked it, or the artifact is not objectionable to a listener. This is particularly true for watermarking in certain types of audio content, like music genres that typically have similar audio effects as part of their innate qualities. Examples include subtle echoes within a particular delay range, modulating harmonics, or modulating frequency with slight frequency or phase shifts. Examples of modulating the harmonics including inserting harmonics, or modifying the magnitude relationships and/or phase relationships between different harmonics of a complex tone.

With the above introductions to watermark type and masking, we have provided a foundation for selection of watermark type and associated perceptual model based on a classification of the audio. Classification of the audio provides attributes about the host audio that indicate the type of audio features it has to support a robust watermark type, as well as audio features that have masking attributes. Together, the support for robust watermark features (or not) and the associated masking ability (or not) enable our selection of watermark type and perceptual modeling best suited to the audio class in terms of watermark robustness and audio quality.

Introduction to Watermark Protocol

As introduced above, the watermark protocol is used to construct auxiliary data into a watermark signal. The protocol specifies data formatting, such as how data symbols are arranged into message fields, and fields are packaged into message packets. It also specifies how watermark signal elements are mapped to corresponding elements of the host audio signal. This mapping protocol may include a scattering or scrambling function that scatters or scrambles the watermark signal elements among host signal elements. This mapping can be one to many, or one to one mapping of each watermark element. For example, when used in conjunction with modulating a watermark element onto a carrier with several elements (e.g., chips) the mapping is one to many, as the resulting modulated carrier elements map the watermark to several host signal elements.

The protocol also defines roles of symbols, fields or other groupings of symbols. These roles include function like error detection, variable data carrying, fixed data carrying (or simply a fixed pattern), synchronization, version control, format identification, error correction, etc. Certain symbols can be used for more than one role. For example, certain fixed bits can be used for error checking and synchronization. We use the term message symbol generally to include binary and M-ary signaling. A binary symbol, for example, may simply be on/off, 1/0, +/−, any of a variety of ways of conveying two states. M-ary signaling conveys more than two states (M states) per symbol.

The watermark protocol also defines whether and to what extent there are different watermark types and layering of watermarks. Further, certain watermarks may not require the concept of being a symbol, as they may simply be a dedicated signal used to convey a particular state, or to perform a dedicated function, like synchronization. The protocol also identifies which cryptographic constructs are to be used to decode the resultant message payload, if any. This may include, for example, identifying a public key to decrypt the payload. This may also include a link or reference to or identification of Broadcast Encryption Constructs.

The watermark protocol specifies signal communication techniques employed, such as a type of data modulation to encode data using a signal carrier. One such example is direct sequence spread spectrum (DSSS) where a pseudo random carrier is modulated with data. There are a variety of other types of modulation, phase modulation, phase shift keying, frequency modulation, etc. that can be applied to generate a watermark signal.

After the auxiliary data is converted into the watermark signal, it is comprised of an array of signal elements. Each element may convey one or more states. The nexus between protocol and watermark type is that the protocol defines what these signal elements are, and also how they are mapped to corresponding audio features. The mapping of the watermark signal to features defines the structure of the watermark in the feature space. As we noted, this feature space for embedding may be different than the feature space in which the signal elements and structure of the watermark are detected.

Introduction to Insertion Methodology

The insertion method is closely related to watermark type, protocol and perceptual model. Indeed, the insertion method may be expressed as applying the selected watermark type, protocol and perceptual model in an embedding function that inserts the watermark into the host audio. It defines how the embedder generates and uses a perceptual mask to insert elements of the watermark signal into corresponding features of the host audio.

From this description, one can see that it is largely defined by the watermark type, protocol, and perceptual model. However, we pay particular attention to mention it separately because the function for modifying the host signal feature based on perceptual model and watermark signal element can take a variety of forms. In the field of watermarking, some conventional insertion techniques may be characterized as additive: the embedding function is a linear combination of a feature change value, scaled or weighted by a gain factor, and then added to the corresponding host feature value. However, even this simple and sometimes useful way of expressing an embedding function in a linear representation often has several exceptions in real world implementations. One exception is that the dynamic range of the host feature cannot accommodate the change value. Another example is that the perceptual model limits the amount of change to a particular limit (e.g., an audibility threshold, which might be zero in some cases, meaning that no change may be made to the feature.) As described previously, the perceptual model provides a masking envelope that provides bounds on watermark signal strength relative to host signal in one or more domains, such as frequency, time-frequency, time, or other transform domains. This masking envelope may be implemented as a gain factor multiplied by the watermark signal, coupled with a threshold function to keep the maximum watermark signal strength within the bounds of the masking envelope. Of course, more sophisticated shaping functions may be applied to increase or decrease the watermark signal structure to fit within the masking envelope.

Some embedding functions are non-linear by design. One such example is a form of non-linear embedding function sometimes referred to as quantization or a quantizer, where the host signal feature is quantized to fall within a quantization bin corresponding to the watermark signal element for that feature. In the case of such functions, the masking envelope may be used to limit the quantization bin structures so that the amount of change inserted by quantization of a feature is within the masking envelope.

In many cases, the change in a value of a feature is relative to one or more other features. Examples include the value of feature compared to its neighbors, or the value of feature compared to some feature that it is paired with, that is not its neighbor. Neighbors can be defined as neighboring blocks of audio, e.g., neighboring time domain segments or neighboring frequency domain segments. This type of insertion method often has non-linear aspects. The amount of change can be none at all, if the host signal features already have the relationship consistent with the desired watermark signal element or the change would violate a perceptibility threshold of the masking envelope. The change may be limited to a maximum change (e.g., a threshold on the magnitude of a change in absolute or relative terms as a function of corresponding host signal features). It may be some weighted change in between based on a gain factor provided by the perceptual model.

The selection of the watermark insertion function may also adapt based on audio classification. As we turn back to FIG. 4, we first note that insertion method is dependent on the watermark type and perceptual model. As such, it does vary with audio classification. In our implementations, the insertion function is tied to the selected watermark type, protocol and perceptual model. It can also be an additional variable that is adapted based on input from the classifier. The insertion function may also be updated in the feedback look of an iterative embedding process, where the insertion function is modified to achieve a desired robustness or audio quality level.

We now provide some examples of particular implementations of watermark signals.

Implementations of DWM Types

In our implementations, options for DWM types include both frequency domain and time domain watermark signals.

One frequency domain option is a constellation of peaks in the frequency magnitude domain. This option can be used as a fixed data, synchronization component of the watermark signal. It may also carry variable data by assigning code symbols to sets of peaks at different frequency locations. Further, auxiliary data may be conveyed by mapping data symbols to particular frequency bands for particular time offsets within a segment of audio. In such case, the presence or absence of peaks within particular bands and time offsets provides another option for conveying data.

There are variations on the basic option of code symbols that correspond to signal peaks. One option is to vary the mapping of a code symbol to inserted peaks at frequency locations over time and/or frequency band. Another is to differentially encode a peak at one location relative to trough or notch at another location. Yet another option is to use the phase characteristics of an inserted peak to convey additional data or synchronization information. For example, the phase of the peak signal can be used to detect the translational shift of the peak.

Another option is a DSSS modulated pseudo random watermark signal applied to selected frequency magnitude domain locations. This particular option is combined with differential encoding for adjacent frames. Within each frame, the DSSS modulation yields a binary antipodal signal in which frequency locations (bump locations) are adjusted up or down according to the watermark signal chip value mapped to the location. In the adjacent frame, the watermark signal is applied similarly, but is inverted. Due to the correlation of the host signal in neighboring frames, this approach allows the detector to increase the watermark to host signal gain by taking the difference between adjacent frames, with the watermark signal adding constructively, and the host signal destructively (i.e. host signal is reduced based on correlation of host signal in these adjacent frames).

This adjacent frame, reverse embedding approach provides greater robustness against pitch invariant time scaling. This approach generally provides better robustness since typically the host signal is the largest source of noise. Pitch invariant time scaling is performed by keeping the frequency axis unchanged while scaling the time axis. For example, in a spectrogram view of the audio signal (e.g., where time is along the horizontal axis and frequency is along the vertical axis), pitch invariant time scaling is obtained by resampling across just the time axis. Watermarking methods for which the detection domain is the frequency domain provide an inherent advantage in dealing with pitch invariant time scaling (since the frequency axis in time-frequency space is relatively un-scaled).

Another frequency domain option employs pairwise differential embedding. As opposed to inverting the watermark in an adjacent frame, the watermark may be mapped to pairs of embedding locations, with the watermark signal being conveyed in the differential relationship between the host signal features at each pair of embedding locations. The differential relationship may convey data in the sign of the difference between quantities measured at the locations, or in the magnitude of the difference, including a quantization bin into which that magnitude difference falls. In the respect of the watermark signal mapping, this is a more general approach then selecting pairs as the same frequency locations within adjacent frames. The pairs may be at separate locations in time and/or frequency. For example, pairs in different critical bands at a particular time, pairs within the same bands at different times, or combinations thereof. Different mappings can be selected adaptively to encode the watermark signal with minimal change and/or maximum robustness, with the mapping being conveyed as side information with the signal (as a watermark payload or otherwise, such as indexing it in a database based on a content fingerprint). This flexibility in mapping increases the chances that the differential between values in the pairs will already satisfy the embedding condition, and thus, not need to be adjusted at all or only slightly to convey the watermark signal.

One time domain watermark signal option is a DSSS modulated signal applied to audio sample amplitude at corresponding time domain locations (time domain bumps). This approach is efficient from the perspective of computational resources as it can be applied without more costly frequency domain transforms. The modulated signal, in one implementation, includes both fixed and variable message symbols. We use binary phase shift key or binary antipodal signaling. The fixed symbols provide a means for synchronizing the detector.

In a DSSS implementation of this time domain watermark, the auxiliary data encoded for each segment of audio comprises a fixed data portion and a data portion. The fixed portion comprises a pseudorandom sequence (e.g., 8 bits). The variable portion comprises a variable data payload portion and an error detection portion. The error detection portion can be selected from a variety of error checking schemes, such as a Cyclic Redundancy Check, parity bits, etc. Together, the fixed and variable portions are error correction coded. This implementation uses a ⅓ rate convolution code on a binary data signal comprises the fixed and variable portions in a binary antipodal signal format. The error correction coded signal is spread via DSSS by m-sequence carrier signals for each binary antipodal bit in the error correction encoded signal to produce a signal comprised of chips. The length of the m-sequence can vary (e.g., 31 to 127 bits are examples we have used). Longer sequences provide an advantage in dealing with multipath reflections at the cost of more computations and at the cost of requiring longer time durations to combat linear time scaling. Each of the resulting chips corresponds to a bump mapped to a bump location.

The bump is shaped for embedding at a bump location in the time domain of the host audio signal according to a sample rate. To illustrate bump shaping, let's start by describing the host audio signal sampling rate as N kHz. The watermark signal may have a different sampling rate, say M kHz, than the host audio signal, with M<N. Then, to embed the watermark signal into the host, the watermark signal is up-sampled by a factor of N/M. For example, audio is at 48 kHz, watermark is at 16 kHz, then every 3 samples of the host will have one watermark "bump". The shape of this bump can be adapted to provide maximum robustness/minimum audibility.

The fixed data portion may be used to carry message symbols (e.g., a sequence of binary data) to reduce false positives. In certain types of watermark signals, there is no explicit (or separate) synchronization signal. Instead, the synchronization signal is implicit. In one of our DSSS time domain implementations, synchronization to linear time scaling is achieved using autocorrelation properties of repeated watermark "tiles." A tile is a complete watermark message that has been mapped to a block of audio signal. "Tiling" this watermark block is a method of repeating it in adjacent blocks of audio. As such, each block carries a watermark tile. The autocorrelation of a tiled watermark signal reveals peaks attributable to the repetition of the watermark. Peak spacing indicates a time scale of the watermark, which is then used to compensate for time scale changes as appropriate in detecting additional watermark data.

Synchronization to translation (i.e., finding the origin of the watermark, where the start of a watermark packet has been shifted or translated) is achieved by repeatedly applying a detector along the host audio in increments of translation shift, and applying a trial decode to check data. One form of check data is an error detection message computed from variable watermark message, such as a CRC of the variable part. However, checking an error detection function for every possible translational shift can increase the computational burden during detection/decoding. To reduce this burden, a set of fixed symbols (e.g., known watermark payload bits) is introduced within the watermark signal. These fixed bits achieve a function similar to the CRC bits, but do not require as much computation (since the check for false positives is just a comparison with these fixed bits rather than a CRC decode).

The region over which a chip is embedded, or the "bump size" may be selected to optimize robustness and/or audio quality. Larger bumps can provide greater robustness. The higher bump size can be achieved by antipodal signaling. For example, when the bump size is 2, the adjacent watermark samples can be of opposite polarity. Note that adjacent host signal samples are usually highly correlated. Therefore, during detection, subtraction of adjacent samples of the received audio signal will reinforce the watermark signal and subtract out the host signal.

Just as differential encoding provides advantages in the frequency domain, so too does it provide potential advantages in other domains. For example, in a differential encoding embodiment for the DSSS time domain option, a positive bump is encoded in a first sample, and a negative bump is encoded in a second, adjacent sample, Exploiting correlation of the host signal in adjacent samples, a differentiation filter in the detector computes feature differences to increase watermark signal gain relative to host signal.

Likewise, as noted above, pairwise differential embedding of features, whether time or frequency domain bumps for example, need not only be corresponding locations in adjacent samples. Sets of pairs may be selected of features whose differential values are likely to be roughly 50% consistent with the sign of the signal being encoded.

This particular DSSS time domain signal construction does not require an additional synchronization component, but one can be used as desired. The carrier signals provide an inherent synchronization function, as they can be detected by sampling the audio and then repeatedly shifting the sampled signal by an increment of a bump location, and applying a correlation over a window fit to the carrier. A trial decode may be performed for each correlation, with the fixed bits used to indicate whether a watermark has been detected with confidence.

One form of synchronization component is a set of peaks in the frequency magnitude domain.

While we have cited some examples of modulating data onto carrier signals, like DSSS, there are a variety of possible modulation schemes that can be applied, either in combination, or as variants. Orthogonal Frequency Division Multiplexing (OFDM) is an appropriate alternative for modulating auxiliary data onto carriers, in this case, orthogonal carriers. This is similar to examples above where encoded bits are spread over carriers, which may be orthogonal pseudorandom carriers, for example.

An OFDM transmission method typically modulates a set of frequencies, using some fixed frequencies for pilot or reference signal embedding, a cyclic prefix, and a guard interval to guard against multipath. The data in OFDM may be embedded in either the amplitude or the phase of a carrier, or both.

In one OFDM embedding approach, some of the host audio signal frequency components above 5 kHz (which have lower audibility), can be completely replaced with the OFDM data carrier frequencies, while maintaining the magnitude envelope of the host audio. This method of embedding will work well only if the host frequencies have sufficient energy in the higher frequencies. By completely replacing the host frequencies with data carrying frequencies, each frequency carrier can be modulated (e.g., using Quadrature Amplitude Modulation (QAM)), to carry more bits. This method can provide higher data rates than the case where we need to protect the data from interference by the host, which restricts us to binary data.

In a second OFDM embedding approach, an unmasked OFDM signal is embedded in audio frequencies above 10 kHz, which have very low audibility. This signaling scheme also has the advantage that very large amounts of data can be embedded using higher order QAM modulation schemes since no protection against host interference is necessary. In case the audio distortion is objectionable, the signal may be modulated using some fixed set of high frequency shaping patterns to reduce audibility of the high frequency distortion. In one aspect, the signal is modulated by high frequency shaping patterns to produce a periodic watermark signal. In another aspect the high frequency shaping patterns are applied in a time-varying, non-periodic high frequency watermark signal. In our experiments, we have discovered that such non-periodic watermark signals tend to attract less attention from humans than high frequency signals with a constant magnitude. It will be recognized that the use of high frequency shaping patterns can be applied in any watermark embedding approach, and is not limited to OFDM embedding.

A different application of a high frequency OFDM signal would be to gather context information about user motion. A microphone listening to an OFDM signal at a fixed position in a static environment will receive certain frequencies more strongly than others. This frequency fading pattern is like a signature of that environment at that microphone location. As the microphone is moved around in the spatial environment, the frequency fingerprint varies accordingly. By tracking how the frequency fingerprint is changing, the detector estimates how fast the user is moving and also track changes in direction of motion.

Some of our embedding options apply a layering of watermark types. Time and frequency domain watermark signals, for example, may be layered. Different watermark layers may be multiplexed over a time-frequency mapping of the audio signal. As evident from the OFDM discussion, layers of frequency domain watermarks can also be layered. For example, watermarks may be layered by mapping them to orthogonal carriers in time, frequency, or time-frequency domains.

For some applications, it is useful to encode a data signal in audio at the frequency range from about 16 kHZ to 22 kHz. There are a variety of reasons for using this range of frequencies. First, it is a range of frequencies where the human auditory system is less sensitive, and thus, humans are less likely to hear it. Second, it remains within the frequency response of many mobile devices, and in particular, the microphones on mobile phones, tablets, PCs etc., and therefore is useful for communicating data to mobile devices as they come in proximity to audio speakers within venues. Third, in many applications of involving ambient audio data signal transmission and microphone capture, there is no host audio content within which to embed the data signal, such as host music or audio signals that are predominantly speech (e.g., like a PA system announcing product information, or the like). Moreover, certain applications dictate that there be little or no audible sound, so that listeners are not distributed or even aware that a data transmission is occurring.

For these applications, data signaling protocols designed for digital watermarking at lower frequencies may be used within this higher frequency range with some adaptations. One adaptation is that when there is no host audio content, it is not necessary to use techniques, like frame reversal or differential signal protocols, to cancel the host content at the detector. For instance, one of our implementations for encoding data in the 16 kHZ to 22 kHz range uses the frequency domain approach described above, but without reversing the polarity on alternating frames. This eases the requirements for synchronization and simplifies the process of accumulating the repeated signal over time to improve the SNR of the data signal to noise in the channel.

Another adaptation is to adapt the data signal weighting as a function of frequency over the frequency range to counter the effects of the frequency response of audio equipment, namely the transmitting speaker frequency response. In the above noted implementation, the audio data signal is weighted such that as the frequency response of the speaker drops from 16 to 22 kHz, the relative weights applied to the data signal are increased proportionately to counter the effect of the speaker's frequency response.

Another adaptation, which may be used in combination with the above weighting or independently, is to shape the data signal in accordance with the sensitivity of the human auditory system over the range of 16 to 22 kHz. The human auditory system sensitivity tends to decrease as frequency increases, and thus the data signal is weighted in a manner that follows this sensitivity curve over the frequency range. The shape of this curve may vary in steepness (e.g., the weighting kept low at the low end of the range and then raised more steeply at a frequency transition point where most humans will not here it, e.g., between about 18-19 kHz).

Various watermarking methodologies described in this document may be adapted for transmitting a signal in this "high frequency" range. The above is one example.

Implementations of Perceptual Models

The perceptual models are adapted based on signal classification, and corresponding DWM type and insertion method that achieves best performance for the signal classification for the application of interest.

The framework for our implementations of perceptual models used for digital watermarking is based on concepts of psychoacoustics-critical bands, simultaneous masking, temporal masking, and threshold of hearing. Each of these aspects is adapted based on signal classification and specifically applied to the appropriate DWM type. Further sophistication is then added to the perceptual model based on empirical evidence and subjective data obtained from tests on both casual and expert listeners for different combinations of audio classifications and watermark types.

The framework for perceptual models (402, FIG. 4) begins by dividing the frequency range into critical bands (e.g., a bark scale—an auditory pitch scale in which pitch units are named Bark). A determination of tonal and noise-like components is made for frequencies of interest within the critical bands. For these components, masking thresholds are derived using masking curves that determine the amount of simultaneous masking the component provides. Similar thresholds are calculated to take into account temporal masking (i.e., across segments of audio). Both forward and backward masking can be taken into account here, although typically forward masking has a larger effect.

Band-Wise Gain

To determine the strength of the watermark signal components in each critical band, subjective listening tests are performed on a set of listeners (both experts as well as casual listeners) on a broad array of audio material (including male/female speech, music of many genres) with various gain or strength factors. An optimal setting for the gain within each critical band is then chosen to provide the best audio quality on this training set of audio material. Alternatively, the band-wise gain can also be selected as a tradeoff between desired audio quality and the desired robustness in a given ambient detection setting.

Combining Spectral Shaping with Simultaneous Masking

For some portions of the audio spectrum, use of simultaneous masking curves used in audio compression coding (e.g., AAC) tends to spread the watermark signal over a wider range of frequency bins. This causes the watermark to be more audible. In such cases, it often suffices to have the watermark signal frequency components take the same spectral shape as the host audio frequency components.

One approach to make the watermark signal components have the same spectral shape as the host audio is to multiply the frequency domain watermark signal components (e.g. +/−bumps or other patterns of the DWM structure as described above) with the host spectrum. The resulting signal can then be added to the host audio (either in the spectral domain or the time domain) after multiplying with a gain factor.

Another way to shape the watermark spectrum like the host spectrum is to use cepstral processing to obtain a spectral envelope (for example by using the first few cepstral coefficients) of the host audio and multiplying the watermark signal by this spectral envelope.

In one embodiment, a hybrid perceptual model is utilized to shape the watermark signal combining both spectral shaping and simultaneous masking. Spectral shaping is used to shape the watermark signal in the first few lower frequency critical bands, while a simultaneous masking model can is used in the higher frequency critical bands. A hybrid model is beneficial in achieving the appropriate tradeoff between perceptual transparency (i.e., high audio quality) and robustness for a given application.

The determination of which regions are processed with the simultaneous masking model and which regions are processed by spectral shaping are performed adaptively using signal analysis. Information from the audio classifiers mentioned earlier can be utilized to make such a determination.

Limiting the Contribution of Spectral Peaks in Spectral Shaping Model

When spectral shaping models are used for shaping the spectrum of the watermark signal to appear similar to the host signal spectrum, large spectral peaks in the host signal can lead to correspondingly large spectral peaks in the watermark signal spectrum. These large peaks can adversely affect audio quality.

Audio quality can be improved by adaptively reducing the strength of such large peaks. For example, the largest frequency peak in the spectrum of an audio segment of interest is identified. A threshold is then set at say 10% of the value of this largest peak. All spectral values that are above this threshold are clipped to the threshold value. Since the value of the threshold is based on the spectrum in any given segment, the thresholding operation is adaptive. Further, the percentage at which to base the threshold can itself be adaptively set based on other statistics in the spectrum. For example, if the spectrum is relatively flat (i.e., not peaky), then a higher percentage threshold can be set, thereby resulting in fewer frequency bins being clipped.

Taking Advantage of Harmonics in Complex Sounds to Encode Information without Impacting Perceptibility A complex tone comprises a fundamental and harmonics. For a complex tone containing pronounced harmonics (e.g., instrumental music like an oboe piece), increasing the magnitude of some harmonics and decreasing the magnitude of other harmonics so that the net magnitude (or energy) is constant will result in the changes being inaudible. A digital watermark can be constructed to take advantage of this property. For example, consider a spread spectrum watermark signal in the frequency domain. The harmonic relationships in complex tones can be exploited to increase some of the harmonics and decrease others (as dictated by the direction of the bumps in the watermark signal) so as to provide a higher signal-to-noise ratio of the watermark signal. This property is useful in watermarking audio content that predominantly consists of instrumental music and certain types of classical music.

When the audio classifier described above identifies a music genre with these tonal and harmonic properties, the perceptual model and watermark type are adapted to take advantage of the inaudibility of these changes in the harmonics. In particular, the harmonic relationships are first identified, and then the relationships are adjusted according to the directions of the bumps in the watermark signal to increase the watermark signal in the harmonics of the host audio frame.

Taking Advantage of Frequency Switching (Frequency Modulation), i.e., Lack of Ability of the Human Auditory System to Distinguish Frequencies that are Closely Spaced, to Encode Information A two-tone complex sound that is temporally separated can be perceived only when the separation in frequency between the two tones exceeds a certain threshold. This separation threshold is different for different frequency ranges. For example, consider a complex sound with a 2000 Hz tone and a 2005 Hz tone alternating every 30 milliseconds. The two tones cannot be perceived separately. When the frequency of the second tone is increased to 2020 Hz, and the same experiment repeated, the two tones can be distinctly distinguished.

This frequency switching property can be taken advantage of to increase the watermark signal-to-noise ratio. For example, consider an audio signal with spectral peaks throughout the spectrum (e.g. voiced speech, tonal components). Based on the frequency switching property, positions of the spectral peaks can be slightly modulated over time without the change being noticeable. The positions of the peaks can be adjusted such that the peaks at the new positions are in the direction of the desired watermark bumps.

Frequency switching can be employed to provide further advantage in differential encoding scheme. For example, in one implementation a positive watermark signal bump is desired at frequency bin F. Assume a spectral peak is present in the current audio segment at this bin location. This spectral peak is also present in the adjacent segment (e g immediately following segment). Then the positive bump can be encoded at frequency bin F, by shifting the peak to the bin F+1 in the latter segment.

The audio classifier identifies parts of an audio signal that have these tonal properties. This can include audio identified as voiced speech or music with spectral attributes exhibiting tonal components across adjacent frames of audio. Based on these properties, the watermark encoder applies a frequency domain watermark structure and associated masking model and encoding protocol to exploit the masking envelope around spectral peaks.

Pre-Conditioning of Audio Content to Lessen Perceptual Impact/Increase Robustness In some instances, the audio classifier determines that the host audio signal consists of sparse components in the spectral domain that are not immediately conducive to robustly hold the watermark signal. In such cases it is advantageous to pre-condition the host audio content to create a better medium for inserting the digital watermark. Examples of such pre-conditioning include using a high-frequency boost or a low-frequency boost prior to embedding. The pre-conditioning has the effect of lessening the perceptual impact of introducing the watermark signal in areas of sparse host signal content. Since pre-conditioning allows more watermark signal components to be inserted, it increases the signal-to-noise ratio and therefore increases robustness during detection.

The type and amount of pre-conditioning can also change as a function of time. For example, consider an equalizer function applied to a segment of audio. This equalizer function can change over time, providing additional flexibility during watermark insertion. The equalizer function at each segment can be chosen to provide maximum correlation of the equalized audio with the host audio while keeping the equalizer function change with respect to the previous segment within certain constraints.

Narrower Masking Curves

The masking curves resulting from the experiments of Fletcher in the early 1950s and their variants (obtained through many experiments by several researchers since then) are widely used in audio compression techniques. However, in the context of digital audio watermarking, use of narrower masking curves may be beneficial to obtain high quality audio. In other words, the spread of masking can be limited further for critical bands adjacent to the critical band in which the masker is present. In the limiting case, when the spread of masking is completely eliminated, the perceptual model resembles the spectral shaping model mentioned earlier.

Multi-Resolution Analysis During Embedding

Spectral analysis plays a central role in the perceptual models used at the embedder. Spectral analysis is typically performed on the Fourier transform, specifically the Fourier domain magnitude and phase and often as a function of time (although other transforms could also be used). One limitation of Fourier analysis is that it provides localization in either time or frequency, not both. Long time windows are required for achieving high frequency resolution, while high time resolution (i.e. very short time windows) results in poor frequency resolution.

Speech signals are typically non-stationary and benefit from short time window analysis (where the audio segments are typically 10 to 20 milliseconds in length). The short time analysis assumes that speech signals are short-term stationary. For audio watermarking, such short term processing is beneficial for speech signals to prevent the watermark signal from affecting audio quality beyond immediate neighborhoods in time.

However, other signals such as tones, certain musical instruments or musical compositions (e.g., arpeggio), and even voiced speech (vowels) have stationary characteristics. For such signals, the spectrum is typically peaky (i.e. has many spectral peaks) and steady over a relatively longer duration of time. If perceptual modeling using short term analysis is used here, the poor spectral resolution can adversely affect the resulting audio quality.

To address these issues a multi-resolution analysis is employed. For example, a classifier of stationary/non-stationary audio can be designed to identify audio segments as stationary or non-stationary. A simple metric such as the variance of the frequencies over time can be used to design such a classifier. Longer time windows (higher frequency resolution) are then used for the stationary segments and shorter time windows are used for the non-stationary segments.

In general, the watermark embedding can be performed at one resolution whereas the perceptual analysis and modeling occurs at a different resolution (or multiple resolutions).

Temporal Masking, Analysis and Modeling

In addition to spectral analysis and modeling, temporal analysis and modeling also plays a crucial role in the perceptual models used at the embedder. A few types of temporal modeling have already been mentioned above in the context of spectro-temporal modeling (e.g., frequency switching can be performed over time, stationarity analysis is performed over multiple time segments). A further advantage can be obtained during embedding by exploiting the temporal aspects of the human auditory system.

Temporal masking is introduced into the perceptual model to take advantage of the fact that the psychoacoustic impact of a masker (e.g. a loud tone, or noise-like component) does not decay instantaneously. Instead, the impact of the masker decays over a duration of time that can last as long as 150 milliseconds to 200 milliseconds (forward masking or post-masking). Therefore, to determine the masking capabilities of the current audio segment, the masking curves from the previous segment (or segments) can be extended to the current segment, with appropriate values of decays. The decays can be determined specifically for the type of watermark signal by empirical analysis (e.g., using a panel of experts for subjective analysis).

Another aspect of temporal modeling is removal of pre and post echoes. Pre and post echoes are introduced during embedding of watermark frequency components (or modulation of the host audio frequency components). For example, consider the case of an event occurring in the audio signal that is very localized in time (for example a clap or a door slam). Assume that this event occurs at the end of an audio segment under consideration for embedding. Modification of the audio signal components to embed the watermark signal can cause some frequency components of this event to be heard slightly earlier in the embedded version than the originally occur in the host audio. These effects can be perceived even in the case of typical audio signals, and are not necessarily constrained to dominant events. The reason is that the host signal's content is used to shape the watermark. After the shaping operation, the watermark is transformed to the time domain before being added to the host audio. Although the host signal power at each frequency can vary over time significantly, the time domain version of the watermark will generally have uniform power over all frequencies over the course of the audio segment. Such pre echoes (and similarly post echoes) can be suppressed or removed by an analysis and filtering in the time domain. This is achieved by generating suitable window functions to apply to the watermark signal, with the window being proportional to the instantaneous energy of the host. An example is a filter-bank analysis (i.e., multiple bandpass filters applied) of both the host audio and the watermark signal to shape the embedded audio to prevent the echoes. Corresponding bands of the host and the watermark are analyzed in the time domain to derive a window function. A window is derived from the energy of the host in each band. A lowpass filter can be applied to this window to ensure that the window shape is smooth (to smooth out energy variations). The watermark signal is then constructed by summing the outcome of multiplying the window of each band with the watermark signal in that band.

Yet another aspect of temporal modeling is the shaping and optimization of the watermark signal over time in conjunction with observations made on the host audio signal. For example, consider the adjacent frame, reverse embedding scheme. Instead of confining the embedding operation to the current segment of audio, this operation can exploit the characteristics of several previous segments in addition to the current segment (or even previous and future segments, if real-time operation is not a constraint). This allows optimization of the relationships between the host components and the watermark components. For example, consider a frequency component in a pair of adjacent frames, the relationship between the components and the desired watermark bump can dictate how much each component in each frame should be altered. If the relationships are already beneficial, then the components need not be altered much. Sometimes, the desired bump may be embedded reliably and in a perceptual transparent manner by altering the frequency component in just one of the frames (out of the adjacent pair), rather than having to alter it in both frames. Many variations and optimizations on these basic concepts are possible to improve the reliability of the watermark signal without impacting the audio quality.

Iterative Embedding

Figure 5:
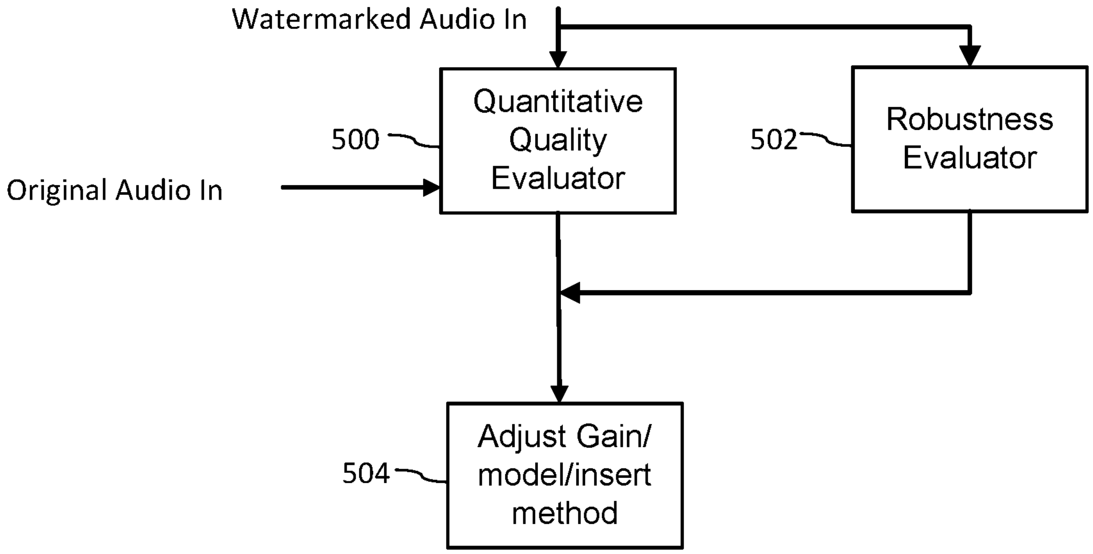
FIG. 5 is a diagram illustrating quality and robustness evaluation as part of an iterative data embedding process.

FIG. 5 is a diagram illustrating quality and robustness evaluation as part of an iterative data embedding process. The iterative embedding process is implemented as a software module within a watermark encoder. It receives the watermarked audio segment after a watermark insertion function has inserted a watermark signal into the segment. There are two primary evaluation modules within the iterative embedding module: quantitative quality evaluator 500 (QQE), and robustness evaluator 502 (RE). Implementations can be designed with either or both of these evaluation modules.

The QQE 500 takes the watermarked audio and the original audio segment and evaluates the perceptual audio quality of the watermarked audio (the "signal under test") relative to the original audio (the "reference signal"). The output of the QQE provides an objective quality measure. It can also include more detailed audio quality metrics that enable more detailed control over subsequent embedding operations. For example, the objective measure can provide an overall quality assessment, while the individual quality metrics can provide more detailed information predicting how the audio watermark impacted particular components that contribute to perceived impairment of quality (e.g., artifacts at certain frequency bands, or types of temporal artifacts like pre or post watermark echoes. Together, these output parameters inform a subsequent embedding iteration, which the embedding process updates one or more embedding parameters to improve the quality of the watermarked audio if the quality measure falls below a desired quality level.

The robustness evaluator 502 modifies the watermarked audio signal with simulated distortion and evaluates robustness of the watermark in the modified signal. The simulated distortion is preferably modeled on the distortion anticipated in the application. The robustness measure provides a prediction of the detector's ability to recover the watermark signal after actual distortion. If this measure indicates that the watermark is likely to be unreliable, the embedder can perform a subsequent iteration of embedding to increase the watermark reliability. This may involve increasing the watermark strength and/or updating the insertion method. In the latter case, the insertion method is updated to change the watermark type and/or protocol. Updates include performing pre-conditioning to increase watermark signal encoding capacity, switching the watermark type to a more robust domain, updating the protocol to use stronger error correction or redundancy, or layering another watermark signal. All of these options may be considered in various combinations, at iteration. For example, a different watermark type may be layered into the host signal in conjunction with one or more previous updates that improve error correction/redundancy, and/or embed in more robust features or domain.

For real time embedding applications, the evaluations of quality and robustness need to be computationally efficient and applicable to relatively small audio segments so as not to introduce latency in the transmission of the audio signal. Examples of real time operation include embedding with a payload at the point of distribution (e.g., terrestrial or satellite broadcast, or network delivery).

After evaluation, the embedder uses the quality and/or robustness measures to determine whether a subsequent iteration of embedding should be performed with updated parameters. This update is reflected in the update module 504, in which the decision to update embedding is made, and the nature of the update is determined. In addition to improving quality in response to a poor quality metric and increasing reliability in response to a poor robustness metric, the evaluations of quality and robustness can be used together to optimize both quality and robustness. The quality measure indicates portions of audio where watermarks signal can be increased in strength to improve reliability of detection, as well as areas where watermark signal strength cannot be increased (but instead should be decreased). Increase in signal strength is primarily achieved through increase in the gain applied in the insertion. More detailed parameters from the quality measurement can indicate the types of features where increased gain can be applied, or indicate alternative insertion methods.

The robustness measure indicates where the watermark signal cannot be reliably detected, and as such, the watermark strength should be increased, if allowable based on the quality measure. It is possible to have conflicting indicators: quality metrics indicating reduction in watermark signal and robustness indicating enhancement of the watermark signal. Such indicators dictate a change in insertion method, e.g., changing to a more robust watermark type or protocol (e.g., more robust error correction or redundancy coding) that allows reduction in watermark signal strength while maintaining acceptable robustness.

Additional descriptions of iterative embedding methods can be found in U.S. Pat. No. 7,352,878 (disclosing iterative embedding, including, e.g., using a perceptual quality assessment), and U.S. Pat. No. 7,796,826 (disclosing iterative embedding, including, e.g., using a robustness assessment), which are hereby incorporated by reference.

Figure 6:
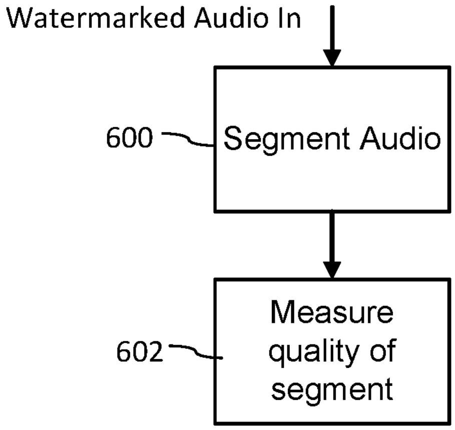
FIG. 6 is a diagram illustrating evaluation of perceptual quality of a watermarked audio signal as part of an iterative embedding process.

FIG. 6 is a diagram illustrating evaluation of perceptual quality of a watermarked audio signal as part of an iterative embedding process. The evaluation is designed for real time operation, and as such, operates on segments of audio of relatively short duration, so that segments can be evaluated quickly and embedding repeated, if need be, with minimal latency in the production of the watermarked audio signal. In one implementation, we use an objective perceptual quality measure based on Perceptual Evaluation of Audio Quality (PEAQ), which is described in industry standard, ITU-R BS.1387-1. We use a software implementation of the basic version of PEAQ, adapted to operate on audio segments of approximately 1 second in duration. As such, the first step is to segment the audio into these segments (600). The next step is to compute the objective quality measure (602) based on the associated perceptual quality parameters for the segment. A segment with a PEAQ score that exceeds a threshold is flagged for another iteration of embedding with an updated embedding parameter. As noted above, this parameter is used to reduce the watermark signal strength by reducing the watermark signal gain in the perceptual model. Alternatively, other watermark embedding parameters, such as watermark type, protocol, etc. may be updated as described above.

While our implementation uses a version of PEAQ, other perceptual quality measures can be used. The documentation of PEAQ and the discussion below identify several perceptual quality measures that can be tested and adapted for watermark embedding applications. Ideally, the perceptual quality measures should be tuned for impairments caused by the watermark insertion methods implemented in the watermark embedder. This can be accomplished by conducting subjective listening tests on a training set of watermarked and corresponding un-watermarked audio content, and deriving a mapping between (e.g., weighted combination of) selected quality metrics from a human auditory system model and a quality measure that causes the derived objective quality measure to best approximate the subjective score from the subjective listening test for each pair of audio.

The auditory system models and resulting quality metrics used to produce an objective quality score can be integrated within the perceptual models of the embedder. The need for iterative embedding can be reduced or eliminated in cases where the perceptual model of the embedder is able to provide a perceptual mask with corresponding perceptual quality metrics that are likely to yield an objective perceptual quality score below a desired threshold. In this case, the audio feature differences that are computed in the objective perceptual quality measure between the original (reference) and watermarked audio are not available in the same form until after the watermark signal is inserted in the audio segment. However, the watermark signal generated from the watermark message and corresponding perceptual model values used to apply them to an audio feature (masking envelope of thresholds and gain values) are available. Therefore, the differences in the features of watermarked and original audio segment can be approximated or predicted from the watermark signal and perceptual mask to compute an estimate of the perceptual quality score. The embedding is controlled so that the constraints set by the perceptual mask, updated if need be to yield an acceptable quality score, are not violated when the watermark signal is inserted. As such, the resulting quality score after embedding should meet the desired threshold when these constraints are adhered to in the embedding process. Nevertheless, the quality score can be validated, as an option, after embedding. Post embedding, the quality score is computed by:

- computing the features of the auditory system models for the watermarked audio,
- re-using the auditory system model features already computed from the original audio,
- computing the differences for marked and unmarked audio,
- generating a perceptual quality score, as a weighted combination of the quality model parameters just computed, and
- checking the score against a quality score threshold.

We have illustrated various related audio analysis components of the embedding system, including audio classifiers (FIG. 3), perceptual models (FIG. 4) and quantitative quality measurement methods (FIGS. 5-6) as separate components. Yet, audio classifiers, perceptual models and quantitative quality measures can be integrated into a perceptual modeling system. In such a system, the classifiers convert the audio into a form for modeling according to auditory system models, and in so doing, compute audio features for an auditory system model that both classify the audio for adaptation of the watermark type, protocol and insertion method, and that are further transformed into masking parameters used for the selected watermark type, protocol and insertion method for that audio segment based on its audio features.

We now provide more discussion of PEAQ, associated ear models, and methods of approximating subjective quality assessment with objective measures. This additional discussion provides support for a variety of audio classifiers, perceptual models and quality measures for different types of audio watermarking.

PEAQ is objective, computer-implemented method of measuring audio quality. It seeks to approximate a subjective listening test. In particular, the PEAQ's objective measurement is intended to provide an objective measurement of audio quality, called Objective Difference Grade (ODG) that predicts a Subjective Difference Grade (SDG) in a subjective test conducted according to ITU-R BS.1116. In this subjective listening test, a listener follows a standard test procedure to assess the impairments separately of a hidden reference signal and the signal under test, each against the known reference signal. In this context, "hidden" refers to fact that the listener does not know which is the reference signal and which is the signal under test that he/she is comparing against the known reference signal. The listener's perceived differences between the known reference and these two sources are interpreted as impairments. The grading scale for each comparison is set out in the following table:

| Grade | Meaning |
| --- | --- |
| 5.0 | Imperceptible |
| 4.0 | Perceptible but not annoying |
| 3.0 | Slightly annoying |
| 2.0 | Annoying |
| 1.0 | Very annoying |

The SDG is computed as:

$$SDG = Grade_{Signal\ Under\ Test} - Grade_{Reference\ Signal}$$

The SDG values should range from 0 to −4, where 0 corresponds to imperceptible impairment and −4 corresponds to an impairment judged as very annoying. In the case of watermarking, the "impairment" would be the change made to the reference signal to embed an audio watermark.

PEAQ uses ear models (auditory system models) to model fundamental properties of the human auditory system and outputs a value, ODG, intended to predict the perceived audio quality (i.e. the SDG if a subjective test were conducted). These models include intermediate stages that model physiological and psycho-acoustical effects. For each of the test and reference signals, the stages that implement the ear models calculate estimates of audible signal components. The various stages of measurement compute parameters called Model Output Variables (MOVs). Some estimates of the audible signal components are calculated based on masking threshold concepts, whereas others are based on internal representations of the ear models.

MOVs based on masking thresholds directly calculate masked thresholds using psycho-physical masking functions. These MOVs are based on the distance of the physical error signal to this masked threshold.

In models based on comparison of internal representations, the energies of both the test and reference signal are spread to adjacent pitch regions in order to obtain excitation patterns. These types of MOVs are based on a comparison between these excitation patterns. Non-simultaneous masking (i.e., temporal masking) is implemented by smearing the signal representations over time.

The absolute threshold is modeled partly by applying a frequency dependent weighting function and partly by adding a frequency dependent offset to the excitation patterns. This threshold is an approximation of the minimum audible pressure [ISO 389-7, Acoustics—Reference zero for the calibration of audiometric equipment—Part 7: Reference threshold of hearing under free-field and diffuse-field listening conditions, 1996].

The main outputs of the psycho-acoustic model are the excitation and the masked threshold as a function of time and frequency. The output of the model at several levels is available for further processing.

The next stages of measurement combine these parameters into a single assessment, ODG, which corresponds to the expected result from a subjective quality assessment. A cognitive model condenses the information from a sequence of audio frames produced by the psychoacoustic model. The most important sources of information for making quality measurements are the differences between the reference and test signals in both the frequency and pitch domain. In the frequency domain, the spectral bandwidths of both signals are measured, as well as the harmonic structure in the error. In the pitch domain, error measures are derived from both the excitation envelope modulation and the excitation magnitude.

The calculated features (i.e. MOVs) are weighted so that their combination results in an ODG that is sufficiently close to the SDG for the particular audio distortion of interest. The weighting is determined from a training set of test and reference signals for which the SDGs of actual subjective tests have been obtained. The training process applies a learning algorithm (e.g., a neural net) to derive a weighting from the training set that maps selected MOVs to an ODG that best fits the SDG from the subjective test.

There are different versions of PEAQ (Basic and Advanced) that offer trade-offs in terms of computational complexity and accuracy. The Basic version is designed for cost effective real time implementation, while the Advanced version is designed to offer greater accuracy. PEAQ incorporates various quality models and associated metrics, including Disturbance Index (DIX), Noise-to-Mask Ratio (NMR), OASE, Perceptual Audio Quality Measure (PAQM), Perceptual Evaluation (PERCEVAL), and Perceptual Objective Measure (POM). The Basic version of PEAQ uses an FFT-based ear model. The Advance version uses both FFT and filter bank ear models.

The audio classifiers, perceptual models and quantitative quality measures of a watermark application can be implemented using various combinations of these techniques, tuned to classify audio and adapt masking for particular audio insertion methods.

Figure 7:
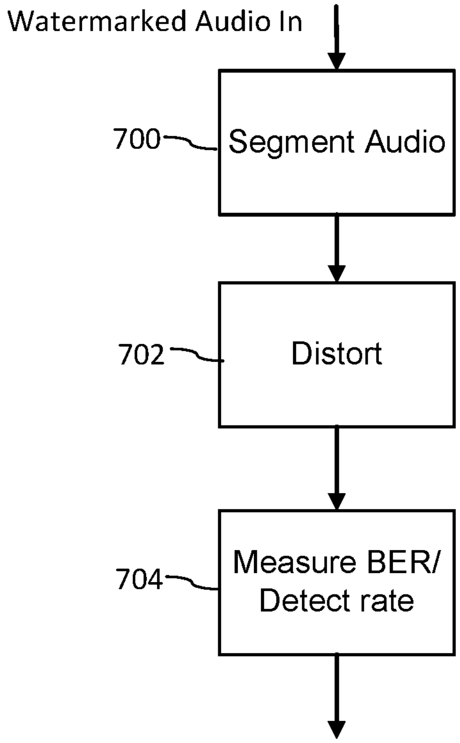
FIG. 7 is a diagram illustrating evaluation of robustness of a digital watermark in audio based on robustness metrics, such as bit error rate or detection rate, after distortion is applied to the watermarked audio signal.

FIG. 7 is a diagram illustrating evaluation of robustness based on robustness metrics, such as bit error rate or detection rate, after distortion is applied to an audio watermarked signal. The first step (700) is to segment the audio into a time segment that is sufficiently long to enable a useful robustness metric to be derived from it. When combined with quality assessment, the segmentation may or may not be different than step 600, depending on whether the sample rate and length of the audio segment for both processes are compatible.

The next step is to apply a perturbation (702) to the watermarked audio segment that simulates the distortion of the channel prior to watermark detection. One example is to simulate the distortion of the channel with Additive White Gaussian Noise (AWGN), in which this AWGN signal is added to the watermarked audio. Other forms of distortion may be applied or modeled and then applied. Direct forms of distortion include applying time compression or warping to simulate distortions in time scaling (e.g., linear time scale shifts or Pitch Invariant Time Scale modification), or data compression techniques (e.g., MP3, AAC) at targeted audio bit-rates. Modeled forms of distortion include adding echoes to simulate multipath distortion and models of audio sensor, transducer and background noise typically encountered in environments where the watermark is detected from ambient audio captured through a microphone. For more background on iterative robustness evaluation, see 7,796,826, incorporated above.

As noted above, there are different measures of robustness, and the length of audio segment and processing to compute them vary with the robustness measure. For watermark bit error rate based measures, the length of the segment should be about the length of watermark packet, such that it is long enough to enable the detector to extract estimates of the error correction coded message symbols (e.g., message bits) from which a bit error rate can be computed. In an implementation where the message symbols of the watermark payload are spread over a carrier and scattered within an audio tile, the audio segment should correspond to at least the length of a tile (and preferably more to get a more accurate assessment). Estimates of the bit error rate can be computed in a variety of ways. One way is to correlate the spread spectrum chips of fixed payload bits with corresponding chip estimates extracted from the audio segment. Another way is to continue through error correction decoding to get a payload, regenerate the spread spectrum signal from that payload, and then correlate the regenerated spread spectrum signal with the chip estimates extracted from the audio segment. The correlation of these two signals provides a measure of the errors at the chip level representation. For other watermark encoding schemes, a metric of bit error can similarly be calculated by determining the correlation between known message elements in the watermark payload, and extracted estimates of those message elements.

Another robustness metric is detection rate. For this metric, the length of the audio segment should be longer to include a number of repeated instances of the watermark message so that a reliable detection rate can be computed. The detection rate, in this context, is the number of validated message payloads that are extracted from the audio segment relative to the total possible message payloads. Each message payload is validated by an error detection metric, such as a CRC or other check on the validity of the payload. Some protocols may involve plural watermark layers, each including a checking mechanism (such as a fixed payload or error detection bits) that can be checked to assess robustness. The layers may be interleaved across time and frequency, or occupy separate time blocks and/or frequency bands.

After computing the robustness measure, the process of FIG. 7 returns to block 504, in FIG. 5, to determine whether another iteration of embedding should be executed, and if so, to also specify the update to the watermark embedding parameters to be used in that iteration. Updates to improve robustness are explained above, and include increasing the watermark signal strength by increasing the gain or masking thresholds in the perceptual mask, changing the protocol to use stronger error correction or more redundancy coding of the payload, and/or embedding the watermark in more robust features. In the latter case, the elements of the watermark signal can be weighted so that they are spread across frequency locations and temporal locations where bit or chip errors were not detected (and as such are more likely to survive distortion).

In the next iteration, the masking thresholds can be increased across dimensions of both time and frequency, such that the masking envelope is increased in these dimensions. This allows the watermark embedder to insert more watermark signal within the masking threshold envelope to make it more robust to certain types of distortion. For instance, bump shaping parameters may be expanded to allow embedding of more watermark signal energy over neighborhood of adjacent frequency or time locations (e.g., extending duration).

As explained in the quantitative quality analysis, the integration of quality metrics in this process of modifying the masking envelope can provide greater assurance that changes made to the masking envelope are likely to keep the perceptual audio quality score below a desired threshold. One way to achieve this assurance is to use more detail assessment of the bit errors to control expansion of the masking envelope in particular embedding features where the bit errors were detected. Another way is to use more detailed quality metrics to identify embedding features where the envelope can be increased while staying within the perceptual audio score. Both of these processes can be used in combination to ensure that robustness enhancements are being made in particular components of the watermark signal where they are needed and the perceptual quality measure allows it.

Example Encoding Process

Figure 8:
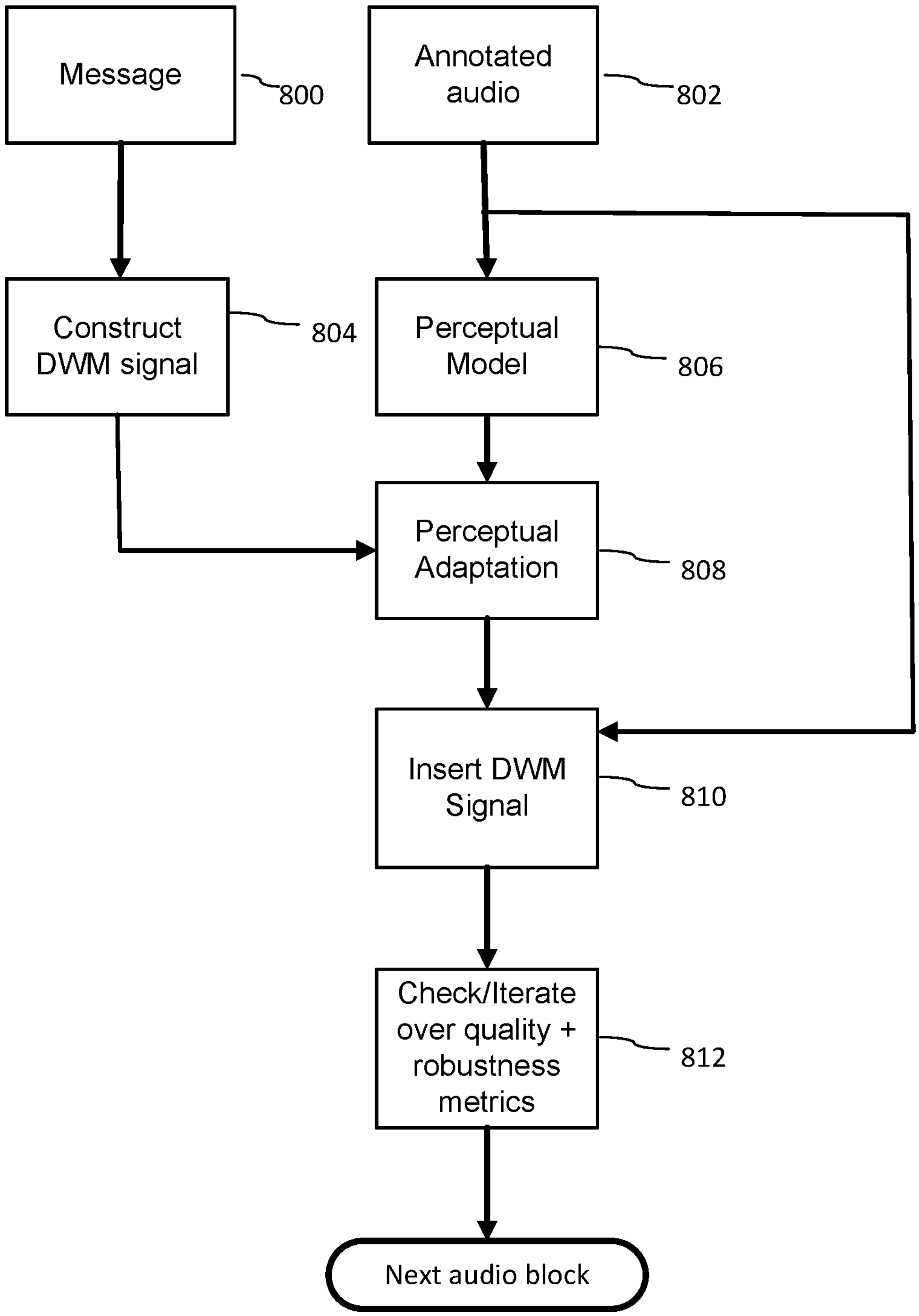
FIG. 8 is a diagram illustrating a process for embedding auxiliary data into audio after pre-classifying the audio.

Having described several of the interchangeable parts of the embedding system, we now turn to an illustration of the processing flow of embedding modules. FIG. 8 is a diagram illustrating a process for embedding auxiliary data into audio after, at least initially, pre-classifying the audio. The input to the embedding system of FIG. 8 includes the message payload 800 to be embedded in an audio segment, the audio segment, and metadata about the audio segment (802) obtained from preliminary classifier modules.

The perceptual model 806 is a module that takes the audio segment, and pre-computed parameters of it from the classifiers and computes a masking envelope that is adapted to the watermark type, protocol and insertion method initially selected based on audio classification. Preferably, the perceptual model is designed to be compatible with the audio classifiers to achieve efficiencies by re-using audio feature extraction and evaluation common to both processes. Where the computations of the audio classifiers are the same as the auditory model of the perceptual model module, they are used to compute the masking envelope. These include computation of spectrum and conversion to auditory scale/critical bands (e.g., either FFT and/or filter bank based), tonal analysis, harmonic analysis, detection of large peaks and quantity of peaks (i.e. is it a "peaky" signal) within a segment. In combination with time domain, signal energy and signal statistics based classifiers noted previously for audio type discrimination, these classifiers discriminate audio classes that are assigned to watermark types of: time domain vs. frequency domain bump structures with modulation type, differential encoding, and error correction/robustness encoding protocols. The bump structures may be spread over time domain regions, frequency domain regions, or both (e.g., using spread spectrum techniques to generate the bump patterns). In the frequency domain, the structures may either be in the magnitude components or the phase components, or both. Watermark types based on a collection of peaks may also be selected, and possibly layered with DSSS bump structures in time/frequency domains.

Additionally, for certain types of audio, the audio classifier or perceptual model computes parameters that signal the need for pre-conditioning. In this case, signal pre-conditioning is applied. Also, certain audio segments may not meet minimum constraints for quality or robustness. Embedding is either skipped, or the protocol is changed to increase watermark robustness encoding, effectively reducing the bit rate of the watermark, but at least, allowing some lesser density of information to be embedded per segment until the embedding conditions improve. These conditions are flagged to the detector by version information carried in the watermark's protocol identifier component.

The embedder uses the selected watermark type and protocol to transform the message into a watermark signal for insertion into the host audio segment. The DWM signal constructor module 804 performs this transformation of a message. The message may include a fixed and variable portion, as well as error detection portion generated from the variable portion. It may include an explicit synchronization component, or synchronization may be obtained through other aspects of the watermark signal pattern or inherent features of the audio, such as an anchor point or event, which provides a reference for synchronization. As detailed further below, the message is error correction encoded, repeated, and spread over a carrier. We have used convolutional coding, with tail biting codes, ⅓ rate to construct an error correction coded signal. This signal uses binary antipodal signaling, and each binary antipodal element is spread spectrum modulated over a corresponding m-sequence carrier. The parameters of these operations depend on the watermark type and protocol. For example, frequency domain and time domain watermarks use some techniques in common, but the repetition and mapping to time and frequency domain locations, is of course, different as explained previously. The resulting watermark signal elements are mapped (e.g., according to a scattering function, and/or differential encoding configuration) to corresponding host signal elements based on the watermark type and protocol. Time domain watermark elements are each mapped to a region of time domain samples, to which a shaped bump modification is applied.

The perceptual adaptation module 808 is a software function that transforms the watermark signal elements to changes to corresponding features of the host audio segment according to the perceptual masking envelope. The envelope specifies limits on a change in terms of magnitude, time and frequency dimensions. Perceptual adaptation takes into account these limits, the value of the watermark element, and host feature values to compute a detail gain factor that adjust watermark signal strength for a watermark signal element (e.g., a bump) while staying within the envelope. A global gain factor may also be used to scale the energy up or down, e.g., depending on feedback from iterative embedding, or user adjustable watermark settings.

Insertion function 810 makes the changes to embed a watermark signal element determined by perceptual adaptation. These can be a combination of changes in multiple domains (e.g., time and frequency). Equivalent changes from one domain can be transformed to another domain, where they are combined and applied to the host signal. An example is where parameters for frequency domain based feature masking are computed in the frequency domain and converted to the time domain for application of additional temporal masking (e.g., removal of pre-echoes) and insertion of a time domain change.

Iterative embedding control module 812 is a software function that implements the evaluations that control whether iterative embedding is applied, and if so, with which parameters being updated. As noted, where the perceptual model is closely aligned with quality and robustness measures, this module can be simplified to validate that the embedding constraints are satisfied, and if not, make adjustments as described in this document.

Processing of these modules repeats with the next audio block. The same watermark may be repeated (e.g., tiled), may be time multiplexed with other watermarks, and have a mix of redundant and time varying elements.

Detection

Figure 9:
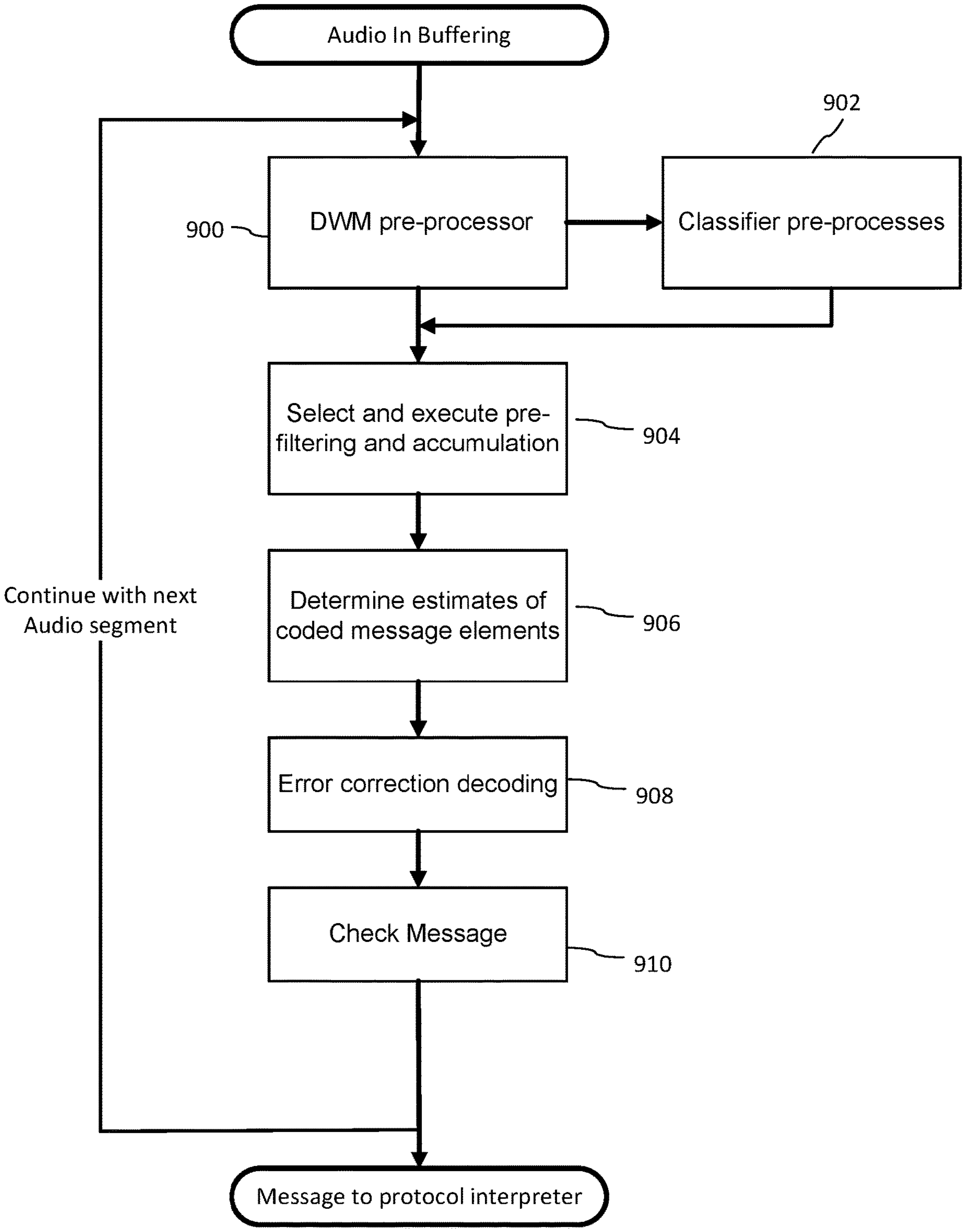
FIG. 9 is flow diagram illustrating a process for decoding auxiliary data from audio.

FIG. 9 is flow diagram illustrating a process for decoding auxiliary data from audio. We have used the terms "detect" and "detector" to refer generally to the act and device, respectively, for detecting an embedded watermark in a host signal. The device is either a programmed computer, or special purpose digital logic, or a combination of both. Acts of detecting encompass determining presence of an embedded signal or signals, as well as ascertaining information about that embedded signal, such as its position and time scale (e.g., referred to as "synchronization"), and the auxiliary information that it conveys, such as variable message symbols, fixed symbols, etc. Detecting a watermark signal or a component of a signal that conveys auxiliary information is a method of extracting information conveyed by the watermark signal. The act of watermark decoding also refers to a process of extracting information conveyed in a watermark signal. As such, watermark decoding and detecting are sometimes used interchangeably. In the following discussion, we provide additional detail of various stages of obtaining a watermark from a watermarked host signal.

FIG. 9 illustrates stages of a multi-stage watermark detector. This detector configuration is designed to be sufficiently general and modular so that it can detect different watermark types. There is some initial processing to prepare the audio for detecting these different watermarks, and for efficiently identifying which, if any, watermarks are present. For the sake of illustration, we describe an implementation that detects both time domain and frequency domain watermarks (including peak based and distributed bumps), each having variable protocols. From this general implementation framework, a variety of detector implementations can be made, including ones that are limited in watermark type, and those that support multiple types.

The detector operates on an incoming audio signal, which is digitally sampled and buffered in a memory device. Its basic mode is to apply a set of processing stages to each of several time segments (possibly overlapping by some time delay). The stages are configured to re-use operations and avoid unnecessary processing, where possible (e.g., exit detection where watermark is not initially detected or skip a stage where execution of the stage for a previous segment can be re-used).

As shown in FIG. 9, the detector starts by executing a preprocessor 900 on digital audio data stored in a buffer. The preprocessor samples the audio data to the time resolution used by subsequent stages of the detector. It also spawns execution of initial pre-processing modules 902 to classify the audio and determine watermark type.

This pre-processing has utility independent of any subsequent content identification or recognition step (watermark detecting, fingerprint extraction, etc.) in that it also defines the audio context for various applications. For example, the audio classifier detects audio characteristics associated with a particular environment of the user, such as characteristics indicating a relatively noise free environment, or noisy environments with identifiable noise features, like car noise, or noises typical in public places, city streets, etc. These characteristics are mapped by the classifier to a contextual statement that predicts the environment. For example, a contextual statement that allows a mobile device to know that it is likely in a car traveling at high-speed can thus inform the operating system on the device on how to better meet the needs of user in that environment. The earlier description of classifiers that leverage context is instructive for this particular use of context. Context is useful for sensor fusion because it informs higher level processing layers (e.g., in the mobile operating system, mobile application program or cloud server program) about the environment that enables those layers to ascertain user behavior and user intent. From this inferred behavior, the higher level processing layers can adapt the fusion of sensor inputs in ways that refines prediction of user intent, and can trigger local and cloud based processes that further process the input and deliver related services to the user (e.g., through mobile device user interfaces, wearable computing user interfaces, augmented reality user interfaces, etc.).

Examples of these pre-processing threads include a classifier to determine audio features that correspond to particular watermark types. Pre-processing for watermark detection and classifying content share common operations, like computing the audio spectrum for overlapping blocks of audio content. Similar analyses as employed in the embedder provide signal characteristics in the time and frequency domains such as signal energy, spectral characteristics, statistical features, tonal properties and harmonics that predict watermark type (e.g., which time or frequency domain watermark arrangement). Even if they do not provide a means to predict watermark type, these pre-processing stages transform the audio blocks to a state for further watermark detection.

As explained in the context of embedding, perceptual modeling and audio classifying processes also share operations. The process of applying an auditory system model to the audio signal extracts its perceptual attributes, which includes its masking parameters. At the detector, a compatible version of the ear model indicates the corresponding attributes of the received signal, which informs the type of watermark applied and/or the features of the signal where watermark signal energy is likely to be greater. The type of watermark may be predicted based on a known mapping between perceptual attributes and watermark type. The perceptual masking model for that watermark type is also predicted. From this prediction, the detector adapts detector operations by weighting attributes expected to have greater signal energy with greater weight.

Audio fingerprint recognition can also be triggered to seek a general classification of audio type or particular identification of the content that can be used to assist in watermark decoding. Fingerprints computed for the frame are matched with a database of reference fingerprints to find a match. The matching entry is linked to data about the audio signal in a metadata database. The detector retrieves pertinent data about the audio segment, such as its audio signal attributes (audio classification), and even particular masking attributes and/or an original version of the audio segment if positive matching can be found, from metadata database. See, for example, U.S. Patent Publication 20100322469 (by Sharma, entitled *Combined Watermarking and Fingerprinting*).

An alternative to using classifiers to predict watermark type is to use simplified watermark detector to detect the protocol conveyed in a watermark as described previously. Another alternative is to spawn separate watermark detection threads in parallel or in predetermined sequence to detect watermarks of different type. A resource management kernel can be used to limit un-necessary processing, once a watermark protocol is identified.

The subsequent processing modules of the detector shown in FIG. 9 represent functions that are generally present for each watermark type. Of course, certain types of operations need not be included for all applications, or for each configuration of the detector initiated by the pre-processor. For example, simplified versions of the detector processing modules may be used where there are fewer robustness concerns, or to do initial watermark synchronization or protocol identification. Conversely, techniques used to enhance detection by countering distortions in ambient detection (multipath mitigation) and by enhancing synchronization in the presence of time shifts and time scale distortions (e.g., linear and pitch invariant time scaling of the audio after embedding) are included where necessary. We explain these options in more detail below.

The detector for each watermark type applies one or more pre-filters and signal accumulation functions that are tuned for that watermark type. Both of these operations are designed to improve the watermark signal to noise ratio. Pre-filters emphasize the watermark signal and/or de-emphasize the remainder of the signal. Accumulation takes advantage of redundancy of the watermark signal by combining like watermark signal elements at distinct embedding locations. As the remainder of the signal is not similarly correlated, this accumulation enhances the watermark signal elements while reducing the non-watermark residual signal component. For reverse frame embedding, this form of watermark signal gain is achieved relative to the host signal by taking advantage of the reverse polarity of the watermark signal elements. For example, 20 frames are combined, with the sign of the frames reversing consistent with the reversing polarity of the watermark in adjacent frames.

We have determined that the following filter selections are best suited for corresponding watermark types as follows:

| Watermark Type | Filter Selection |
|---|---|
| Time domain, watermark elements are positive and negative "bumps" in time domain regions | Non-linear filters |
| | Extended dual axis |
| | Differentiation and quad axis |
| Frequency domain, watermark is a collection of peaks in frequency magnitude | Non-linear filters |
| | Bi-axis |
| | Dual-axis |
| | Infinite clipping |
| | Increased extent non-linear filters |
| | Linear filters |
| | Differentiation |
| Frequency domain, watermark elements are positive and negative "bumps" in frequency domain locations | Cepstral filtering to detect and remove slow moving part |
| | Non-linear (with particular non-linear functions not the same as time domain watermark filter) |
| | Frequency application (e.g., filter support spans neighboring frequency locations) |
| | Time Frequency (i.e. spectrogram) application (e.g. filter support spans neighboring frequency locations in current audio frame and adjacent audio frames) |
| | Normalization (lower complexity relative to Cepstral filter) |

Below, we will return to a more detailed discussion of the filter selection, implementation, and optimization by applying stages of filters and accumulation.

The output of this configuration of filter and accumulator stages provides estimates of the watermark signal elements at corresponding embedding locations, or values from which the watermark signal can be further detected. At this level of detecting, the estimates are determined based on the insertion function for the watermark type. For insertion functions that make bump adjustments, the bump adjustments relative to neighboring signal values or corresponding pairs of bump adjustments (for pairwise protocols) are determined by predicting the bump adjustment (which can be a predictive filter, for example). For peak based structures, pre-filtering enhances the peaks, allowing subsequent stages to detect arrangements of peaks in the filtered output. Pre-filtering can also restrict the contribution of each peak so that spurious peaks do not adversely affect the detection outcome. For quantized feature embedding, the quantization level is determined for features at embedding locations. For echo insertion, the echo property is detected for each echo (e.g., an echo protocol may have multiple echoes inserted at different frequency bands and time locations). In addition, pre-filtering provides normalization to audio dynamic range (volume) changes.

The embedding locations for coded message elements are known based on the mapping specified in the watermark protocol. In the case where the watermark signal communicates the protocol, the detector is programmed to detect the watermark signal component conveying the protocol based on a predetermined watermark structure and mapping of that component. For example, an embedded code signal (e.g., Hadamard code explained previously) is detected that identifies the protocol, or a protocol portion of the extensible watermark payload is decoded quickly to ascertain the protocol encoded in its payload.

Returning to FIG. 9, the next step of the detector is to aggregate estimates of the watermark signal elements. This process is, of course, also dependent on watermark type and mapping. For a watermark structure comprised of peaks, this includes determining and summing the signal energy at expected peak locations in the filtered and accumulated output of the previous stage. For a watermark structure comprised of bumps, this includes aggregating the bump estimates at the bump locations based on a code symbol mapping to embedding locations. In both cases, the estimates of watermark signal elements are aggregated across embedding locations.

In our time domain DSSS implementation, this detection process can be implemented as a correlation with the carrier signal (e.g., m-sequences) after the pre-processing stages. The pre-processing stages apply a pre-filtering to an approximately 9 second audio frame and accumulate redundant watermark tiles by averaging the filter output of the tiles within that audio frame. Non-linear filtering (e.g., extended dual axis or differentiation followed by quad axis) produces estimates of bumps at bump locations within an accumulated tile. The output of the filtering and accumulation stage provides estimates of the watermark signal elements at the chip level (e.g., the weighted estimate and polarity of binary antipodal signal elements provides input for soft decision, Viterbi decoding). These chip estimates are aggregated per error correction encoded symbol to give a weighted estimate of that symbol. Robustness to translational shifts is improved by correlating with all cyclical shift states of the m-sequence. For example, if the m-sequence is 31 bits, there are 31 cyclical shifts. For each error correction encoded message element, this provides an estimate of that element (e.g., a weighted estimate).

In the counterpart frequency domain DSSS implementation, the detector likewise aggregates the chips for each error correction encoded message element from the bump locations in the frequency domain. The bumps are in the frequency magnitude, which provides robustness to translation shifts.

Next, for these implementations, the weighted estimates of each error correction coded message element are input to a convolutional decoding process. This decoding process is a Viterbi decoder. It produces error corrected message symbols of the watermark message payload. A portion of the payload carries error detection bits, which are a function of other message payload bits.

To check the validity of the payload, the error detection function is computed from the message payload bits and compared to the error detection bits. If they match, the message is deemed valid. In some implementations, the error detection function is a CRC. Other functions may also serve a similar error detection function, such as a hash of other payload bits.

Coping with Distortions

For applications where distortions to the audio signal are anticipated, a configuration of detector stages is included within the general detection framework explained above with reference to FIG. 9.

Fast Detect Operations and Synchronization

One strategy for dealing with distortions is to include a fast version of the detector that can quickly detect at least a component of the watermark to give an initial indicator of the presence, position, and time scale of the watermark tile. One example, explained above, is a detector designed solely to detect a code signal component (e.g., a detector of a Hadamard code to indicate protocol), which then dictates how the detector proceeds to decode additional watermark information.

In the time domain DSSS watermark implementation, another example is to compute a partially decoded signal and then correlate the partially decoded signal with a fixed coded portion of the watermark payload. For each of the cyclically shifted versions of the carrier, a correlation metric is computed that aggregates the bump estimates into estimates of the fixed coded portion. This estimate is then correlated with the known pattern of this same fixed coded portion at each cyclic shift position. The cyclic shift that has the largest correlation is deemed the correct translational shift position of the watermark tile within the frame. Watermark decoding for that shift position then ensues from this point.

In the frequency domain DSSS implementation, initial detection of the watermark to provide synchronization proceeds in a similar fashion as described above. The basic detector operations are repeated each time for a series of frames (e.g., 20) with different amounts of frame delay (e.g., 0, ¼, ½, and ¾ frame delay). The chip estimates are aggregated and the frames are summed to produce a measure of watermark signal present in the host signal segment (e.g., 20 frames long). The set of frames with the initial coarse frame delay (e.g., 0, ¼, ½, and ¾ frame delay) that has the greatest measure of watermark signal is then refined with further correlation to provide a refined measure of frame delay. Watermark detection then proceeds as described using audio frames with the delay that has been determined with this synchronization approach. As the initial detection stages for synchronization have the same operations used for later detection, the computations can be re-used, and/or stages used for synchronization and watermark data extraction can be re-used.

These approaches provide synchronization adequate for a variety of applications. However, in some applications, there is a need for greater robustness to time scale changes, such as linear time scale changes, or pitch invariant time scale changes, which are often used to shrink audio programs for ad insertion, etc. in entertainment content broadcasting.

Time scale changes can be countered by using the watermark to determine changes in scale and compensate for them prior to additional detection stages.

One such method is to exploit the pattern of the watermark to determine linear time scale changes. Watermark structures that have a repeated structure, such as repeated tiles as described above, exhibit peaks in the autocorrelation of the watermarked signal. The spacing of the peaks corresponds to spacing of the tiles, and thus, provides a measure of the time scale. Preferably, the watermarked signal is sampled and filtered first, to boost the watermark signal content. Then the autocorrelation is computed for the filtered signal. Next, peaks are identified corresponding to watermark tiles, and the spacing of the peaks measured to determine time scale change. The signal can then be re-scaled, or detection operations re-calibrated such that the watermark signal embedding locations correspond to the detected time scale.

Another method is to detect a watermark structure after transforming the host signal content (e.g., post filtered audio) into a log scale. This converts the expansion or shrinking of the time scale into shifts, which are more readily detected, e.g., with a sliding correlation operation. This can be applied to frequency domain watermark (e.g., peak based watermarks). For instance, the detector transforms the watermarked signal to the frequency domain, with a log scale. The peaks or other features of the watermark structure are then detected in that domain.

For the case of the frequency domain reverse embedding scheme described above, linear time scale (LTS) and pitch invariant time scale (PITS) changes distort the spacing of frames in the frequency domain. This distortion should be detected and corrected before accumulating the watermark signal from the frames. In particular, to achieve maximum gain by taking the difference of frames with reverse polarity watermarks, the frame boundaries need to be determined correctly. One strategy for countering time scale changes is to apply the detector operations (e.g., synchronization, or partial decode) for each of several candidate frame shifts according to a pattern of frame shifts that would occur for increments of LTS or PITS changes. For each candidate, the detector executes the synchronization process described above and determines the frame arrangement with highest detection metric (e.g., the correlation metric used for synchronization). This frame arrangement is then used for subsequent operations to extract embedded watermark data from the frames with a correction for the LTS/PITS change.

Another method for addressing time scale changes is to include a fixed pattern in the watermark that is shifted to baseband during detection for efficient determination of time scaling. Consider, for example, an implementation where a frequency domain watermark encoded into several frequency bands includes one band (e.g., a mid-range frequency band) with a watermark component that is used for determining time scale. After executing similar pre-filtering and accumulation, the resulting signal is shifted to baseband (i.e. with a tuner centered at the frequency of the mid-range band where the component is embedded). The signal may be down-sampled or low pass filtered to reduce the complexity of the processing further. The detector then searches for the watermark component at candidate time scales as above to determine the LTS or PITS. This may be implemented as computing a correlation with a fixed watermark component, or with a set of patterns, such as Hadamard codes. The latter option enables the watermark component to serve as a means to determine time scale efficiently and convey the protocol version. An advantage of this approach is that the computational complexity of determining time scale is reduced by virtue of the simplicity of the signal that is shifted to baseband.

Another approach for determining time scale is to determine detection metrics at candidate time scales for a portion of the watermark dedicated to conveying the protocol (e.g., the portion of the watermark in an extensible protocol that is dedicated to indicating the protocol). This portion may be spread over multiple bands, like other portions of the watermark, yet it represents only a fraction of the watermark information (e.g., 10% or less). It is, thus, a sparse signal, with fewer elements to detect for each candidate time scale. In addition to providing time scale, it also indicates the protocol to be used in decoding the remaining watermark information.

In the time domain DSSS implementation, the carrier signal (e.g., m-sequence) is used to determine whether the audio has been time scaled using LTS or PITS. In LTS, the time axis is either stretched or squeezed using resampled time domain audio data (consequently causing the opposite action in the frequency domain) In PITS, the frequency axis is preserved while shortening or lengthening the time axis (thus causing a change in tempo). Conceptually PITS is achieved through a resampling of the audio signal in the time-frequency space. To determine the type of scaling, a correlation vector containing the correlation of the carrier signal with the received audio signal is computed over a window equal to the length of the carrier signal. These correlation vectors are then stacked over time such that they form the columns of a matrix. This matrix is then viewed or analyzed as an image. In audio which has no PITS, there will be a prominent, straight, horizontal line in the image corresponding to the matrix. This line corresponds to the peaks of the correlation with the carrier signal. When the audio signal has undergone LTS, the image will still have a prominent line, but it will be slanted. The slope of the slant is proportional to the amount of LTS. When the audio signal has undergone PITS, the line will appear broken, but will be piecewise linear. The amount of PITS can be inferred from the proportion of broken segments in the image.

Ambient Detection

Ambient detection refers to detection of an audio watermark from audio captured from the ambient environment through a sensor (i.e. microphone). In addition to distortions that occur in electromagnetic wave transmission of the watermarked audio over a wire or wireless (e.g., RF signaling) transmission, the ambient audio is converted to sound waves via a loudspeaker into a space, where it can be reflected from surfaces, attenuated and mixed with background noise. It is then sampled via a microphone, converted to electronic form, digitized and then processed for watermark detection. This form of detection introduces other sources of noise and distortion not present when the watermark is detected from an electronic signal that is electronically sampled 'in-line' with signal reception circuitry, such as a signal received via a receiver. One such noise source is multipath reflection or echoes. For these applications, we have developed strategies to detect the watermark in the presence of distortion from the ambient environment.

One embodiment takes advantages of audio reflections through a rake receiver arrangement. The rake receiver is designed to detect reflections, which are delayed and (usually) attenuated versions of the watermark signal in the host audio captured through the microphone. The rake receiver has set of detectors, called "fingers," each for detecting a different multipath component of the watermark. For the time domain DSSS implementation, a rake detector finds the top N reflections of the watermark, as determined by the correlation metric. Intermediate detection results (e.g., aggregate estimates of chips) from different reflections are then combined to increase the signal to noise ratio of the watermark as described above in stages of signal accumulation, spread spectrum demodulation, and soft decision weighting.

The challenging aspects of the rake receiver design are that the number of reflections are not known (i.e., the number of rake fingers must be estimated), the individual delays of the reflections are not known (i.e., location of the fingers must be estimated), and the attenuation factors for the reflections are not known (i.e., these must be estimated as well). The number of fingers and their locations are estimated by analyzing the correlation outcome of filtered audio data with the watermark carrier signal, and then, observing the correlation for each delay over a given segment (for a long audio segment, e.g., 9 seconds, the delays are modulo the size of the carrier signal). A large variance of the correlation for a particular delay indicates a reflection path (since the variation is caused by noise and the oscillation of watermark coded bits modulated by the carrier signal). The attenuation factors are estimated using a maximum likelihood estimation technique.

Generally, the technical problem can be summarized as follows: the received signal contains several copies of the transmitted signal, each delayed by some unknown time and attenuated by some unknown constant. The attenuation constant can even be negative. This is caused by multiple physical paths in the ambient channel. The larger the environment (room), the larger the delays can be.

In this embodiment, the watermark signal consists of finite sequence of [+C −C +C −C . . . ], where C is chip-sequence of a given length (usually bipolar signal of length $2^k-1$) and each sign corresponds to coded bit we want to send. If no multipath is present, correlating the filtered audio with the original chip sequence C results in a noisy set of +-peaks with delay equal to the chip sequence length. If multipath is present, the set of correlation peaks also contains other +-1 attenuated peaks shifted by some delay. The delta and attenuation factor, A, of the multipath channel, can be expressed as:

$$\text{Output of multipath} = \text{input}(i) + A * \text{input}(i + \text{delta}),$$

Using the above expression, the optimal detector should correlate the filtered audio with modified chip sequence (this is the matched filter):

$$\text{Matched filter}(i) = C(i) + A * C(i + \text{delta}).$$

This is known as the rake receiver because each tap (there can be more than 2) combines the received data into final metric used for synchronization/message demodulation.

In practice, we do not know (P1) the number of rake fingers (#of paths), (P2) individual delays, (P3) individual attenuation factors.

Solution: Let Z=(Z_1, . . . , Z_n) be the correlation of filtered (and Linear Time Shift corrected) audio with the original chip sequence C=(C_1, . . . , C_m). Problems P1 and P2 can be solved by looking at vector V=(V_1, . . . , V_m)

$$V\_i = Z\_i\hat{}2 + Z\_(i+m)\hat{}2 + Z\_(i+2m)\hat{}2 + \ldots$$

V_i is essentially variance of the correlation. It is large if there is any path associated with the delay i (delays are modulo size of chip sequence) and it is relatively small if there is not any path since the variance is only caused by noise. If the path is present, the variance is due to the noise AND due to the oscillating coded bits modulated on top of C.

A pre-processor in the detector seeks to determine the number of rake fingers, the individual delays, and the attenuation factors. To determine the number of rake fingers, the pre-processor in the detector starts with the assumption of a fixed number of rake fingers (e.g., 40). If there are, for example, 2 paths present, all fingers but these two have attenuation factors near zero. The individual delays are determined by measuring the delay between correlation peaks. The pre-processor determines the largest peak and it is assigned to be the first finger. Other rake fingers are estimated relative to the largest peak. The distance between the first and second peak is the second finger, and so on (distance between first and third is the third finger).

To solve for individual attenuation factors, the pre-processor estimates the attenuation factor A with respect to the strongest peak in V. The attenuation factor is obtained using a Maximum Likelihood estimator. Once we have estimated the rake receiver parameters, a rake receiver arrangement is formed with those parameters.

Using a rake receiver, the pre-processor estimates and inverts the effect of the multipath. This approach relies on the fact that the watermark is generated with a known carrier (e.g., the signal is modulated with a known chip sequence) and that the detector is able to leverage the known carrier to ascertain the rake receiver parameters.

Since the reflections can change as a user carries a mobile device around a room (e.g., a mobile phone or tablet around a room near different loudspeakers and objects), the rake receiver can be adapted over time (e.g., periodically, or when device movement is detected from other motion or location sensors within a mobile phone). An adaptive rake is a rake receiver where the detector first estimates the fingers using a portion of the watermark signal, and then proceeds as above with the adapted fingers. At different points in time, the detector checks the time delays of detections of the watermark to determine whether the rake fingers should be updated. Alternatively, this check may be done in response to other context information derived from the mobile device in which the detector is executing. This includes motion sensor data (e.g., accelerometer, inertia sensor, magnetometer, GPS, etc.) that is accessible to the detector through the programming interface of the mobile operating system executing in the mobile device.

Ambient detection can also aid in the discovery of certain impediments that can prevent reliable audio watermark detection. For example, in venues such as stores, parks, airports, etc., or any other space (indoor or outdoor), where some identifiable sound is played by a set of audio output devices such as loudspeakers, detection of audio watermarks by a detector (e.g., integrated as part of a receiving device such as a microphone-equipped smartphone, tablet computer, laptop computer, or other portable or wearable electronic device, including personal navigation device, vehicle-based computer, etc.) can be made difficult due to the presence of detection "dead zones" within the venue. As used herein, a detection dead zone is an area where audio watermark detection is either not possible or not reliable (e.g., because an obstruction such as a pillar, furniture or a tree exists in the space between the receiving device and a speaker, because the receiving device is physically distant from speakers, etc.). To eliminate or otherwise reduce the size of such detection dead zones, the same audio watermark signal is "swept" across different speakers within the set. In one aspect the audio watermark signal can be swept by driving different speakers within the set, at different times, to output the audio watermark signal. The phase or delay difference of the audio watermark signal applied to speakers within the set can be varied randomly, periodically, or according to any suitable space-time block coding technique (e.g., Alamouti's code, etc.) to sweep the audio watermark signal across speakers within the set. In one aspect, and depending on the relative arrangement of the speakers within the set, the audio watermark signal is swept according to known beam steering techniques to direct the audio watermark signal in a spatially-controlled manner. In one embodiment, a system such as the system described in the above-incorporated US Patent Publications 20120214544 and 20120214515, in which an audio output control device (e.g., controller 122, as described in US Patent Publications 20120214544 and 20120214515) can control output of the same audio watermark signal by each speaker so as to sweep the audio watermark signal across speakers within the set. Generally, the speakers are driven such that the audio watermark signal is swept while the identifiable sound is played. In addition to reducing or eliminating detection dead zones, sweeping the audio watermark signal can also reduce detection sensitivity to speaker orientation and echo characteristics, and may also reduce the audibility of the audio watermark signal.

Frequency Domain Autocorrelation Method

The autocorrelation method mentioned above to recover LTS can also be implemented by computing the autocorrelation in the frequency domain. This frequency domain computation is advantageous when the amount of LTS present is extremely small (e.g. 0.05% LTS) since it readily allows an oversampled correlation calculation to obtain subsample delays (i.e., fractional scaling). The steps in this implementation are:

1. Pre-filter the received audio
2. Do FFT of a segment of the received audio. The segment should contain at least two, preferably more, tiles of the watermark signal (our time domain DSSS implementation uses both 6 second and 9 second segments)

3. Multiply the FFT coefficients with themselves (i.e., square for autocorrelation)
4. Zero pad (to achieve oversampling the resulting autocorrelation) and compute inverse FFT to obtain the autocorrelation. In our implementation, the inverse FFT is 8× larger than the forward FFT of Step 2, achieving 8× oversampling of the autocorrelation.
5. Find peak in the autocorrelation The location of the peak in the autocorrelation provides an estimate of the amount of LTS. To correct for LTS, the received audio signal must be resampled by a factor that is inverse of the estimated LTS. This resampling can be performed in the time domain. However, when the LTS factors are small and the precision required for the DSSS approach is high, a simple time domain resampling may not provide the required accuracy in a computationally efficient manner (particularly when attempting to resample the pre-filtered audio). To address this issue, our implementation uses a frequency domain interpolation technique. This is achieved by computing the FFT of the received audio, interpolating in the frequency domain using bilinear complex interpolation (i.e., phase estimation technique) and then computing an inverse FFT. For a description of a phase estimation technique, please see U.S. Patent Publication 2012-0082398, SIGNAL PROCESSORS AND METHODS FOR ESTIMATING TRANSFORMATIONS BETWEEN SIGNALS WITH PHASE ESTIMATION, which is hereby incorporated by reference.

Step 4 can be computationally prohibitive since the IFFT would need to be very large. There are simpler methods for computing autocorrelation when only a portion of the autocorrelation is of interest. Our implementation uses a technique proposed by Rader in 1970 (C. M. Rader, "An improved algorithm for high speed autocorrelation with applications to spectral estimation", IEEE Transactions on Acoustics and Electroacoustics, December 1970).

Filters

Nonlinear Filters for Robust Audio Watermark Recovery

We use an assortment of non-linear filters in various embodiments described above. One such filter is referred to as "biaxis." This filter is applied to sampled audio data, in the time or transform domain (frequency domain). The biaxis filter compares a sample and each of its neighbors. This comparison can be calculated as a difference between the sample values. The comparison is subjected to a non-linear function, such as a signum function. The extent and design of this filter is a tradeoff between robustness, speed, and ease of implementation.

In other words, the filter support could be generalized and expanded to an arbitrary size (say 5 samples or 7 samples, for example), and the non-linearity could also be replaced by any other non-linearity (provided the outputs are real). A filter with an expanded support region is referred to as an extended filter. Examples of filters illustrating support of one sample in each direction may be expanded to provide an extended version.

These types of filters may be implemented using look up tables for efficient operation. See, for example, U.S. Pat. No. 7,076,082, which is hereby incorporated by reference.

An example of the 1D Biaxis filter method for audio samples is:

1. For 3 sample values, x[n−1], x[n], and x[n+1]
2. Output1 is given by
   +1 if x[n]>x[n−1]
   1 if x[n]<x[n−1]
   0 if x[n]==x[n−1]
3. Output2 is given by
   +1 if x[n]>x[n+1]
   1 if x[n]<x[n+1]
   0 if x[n]==x[n+1]
4. Output at sample location n is then given by
   Output=Output1+Output2
5. Repeat above steps for the next sample location and so on.

A set of typical example steps for using the Biaxis filter during watermark detection include—

1. Take one block of the time domain signal (say 512 samples)
2. Apply the Biaxis filter to this block of the signal
3. Apply appropriate window function to the output of Biaxis
4. Compute the FFT of the windowed data to obtain the complex spectrum
5. Obtain the Fourier magnitude from the complex spectrum obtained in Step 4.
6. Repeat Steps 1-5 for the next (possibly overlapping) block of the time domain signal, each time accumulating the magnitudes into an accumulation buffer.
7. Detect peaks in the accumulated magnitude in the accumulation buffer.

The accumulation in Step 6 is performed on portions of the signal where the watermark is supposed to be present (e.g., based on classifier output).

Steps 5-7 are used for detecting watermark types based on frequency domain peaks, and the effect of this process is to enhance peaks in the frequency (FFT) magnitude domain.

An example of a filter similar to Biaxis, but with expanded support is the Quadaxis1D filter (where 1D denotes one-dimensional), called Quadaxis in short. In Quadaxis, 2 neighboring samples on either side of the sample being filtered are considered. As in the case of Biaxis, an intermediate output is calculated for each comparison of the central sample with its neighbors. When the signum (sign) non-linearity is used, the Quadaxis output can be expressed as:

$$\text{output}=\text{sign}(x[n]-x[n-2])+\text{sign}(x[n]-x[n-1])+\text{sign}(x[n]-x[n+1])+\text{sign}(x[n]-x[n+2])$$

Another variant is called the dual axis filter.

The Dualaxis1D filter also operates on a 3-sample neighborhood of the time domain audio signal like the Biaxis filter. The Dualaxis method is 1. For 3 sample values, x[n−1], x[n], and x[n+1]
2. Compute avg=(x[n−1]+x[n+1])/2
3. Output at sample location n is then given by
   +1 if x[n]>avg
   −1 if x[n]<avg
   0 if x[n]==avg
4. Repeat above steps for the next sample location and so on.

The Dualaxis1D filter has a low-pass characteristic as compared to the Biaxis filter due to the averaging of neighboring samples before the non-linear comparison. As a result, the Dualaxis1D filter produces fewer harmonic reflections as compared to the Biaxis filter. In our experiments, the Dualaxis1D filter provides slightly better characteristics than the Biaxis filter in conditions where the signal degradation is severe or where there is excessive noise. As with Biaxis, the extent and design of this filter is a tradeoff between robustness, speed, and ease of implementation.

Increased Extent Non-Linear Filters

The concepts described above for non-linear filters such as the Biaxis and Dualaxis1D filters can be extended further to design filters that have an increased extent (larger number of taps). One approach to increase the extent is already mentioned above—to increase the filter support by including more neighbors. Another approach is to create increased extent filters by convolving the basic filters with other filters to impart desired properties.

A non-linear filter such as Dualaxis1D essentially consists of a linear operation (FIR filter) followed by application of a nonlinearity. In the case of the Dualaxis1D filter, the FIR filter consists of the taps [−1 2 −1] and the non-linearity is a signum function. An example of an increased extent filter consists of the filter kernel [1 −3 3 −1]. This particular filter is derived by the convolution of the linear part of the Dualaxis1D filter and the simple differentiation filter [1 −1] described earlier. The output of the increased extent filter is then subjected to the signum non-linearity. Similar filters can be constructed by concatenating filters having desired properties. For example, larger differentiators could be used depending on knowledge of the watermark signal and audio signal properties (e.g. speech vs. music). Similarly, the signum nonlinearity could be replaced by other non-linearities including arbitrarily shaped non-linearities to take advantage of particular characteristics of the watermark signal or the audio signal.

Infinite Clipping

In infinite clipping, just the zero crossings are preserved. This corresponds to taking the sign of the audio signal. Applying infinite clipping as a prefilter before computing the Fourier magnitude can have the effect of enhancing peaks in the Fourier magnitude domain Results from our experiments suggest that infinite clipping as a pre-filter may be more suitable for speech signals than for audio signals.

Linear Filters

Linear filters may be used alone or in combination with non-linear filters. One example is a differentiation filter. Often differentiation is used in conjunction with other techniques (as described below) to obtain a significant improvement.

An example of a differentiation filter is a [1 −1] filter. Other differentiators could be used as well.

Filter Combinations

One or more of the techniques mentioned above could be combined to attain further enhancements to the watermark signal. A couple of specific examples are given below. Other combinations could be formulated depending on the characteristics of the watermark signal, the characteristics of the host signal and environment, and robustness requirements.

In auditory experiments, it has been shown that differentiation before infinite clipping improves the intelligibility of speech signals. See, e.g., M. R. Shroeder, Computer Speech: Recognition, Compression, Synthesis, Springer, 2004. In our limited experiments we have found this to be true of general audio signals (music, speech, songs) as well. The improved intelligibility can be attributed to the higher frequencies being enhanced. Using differentiation followed by infinite clipping improves the detection of the watermark signal in the frequency domain.

Note that the intelligibility of the differentiated and infinite clipped signal is nowhere near that of the audio signal before these operations. However, the SNR of the watermark is higher in the resulting signal.

Another approach is differentiation followed by dual axis filtering. We found this approach to enhance peaks of peak based frequency domain watermarks.

Combined Magnitude for Frequency Domain Watermarks

The non-linear filters described above tend to enhance the higher frequency regions. Depending on the frequencies used in the watermark signal, a weighted combination of the frequency magnitudes with and without the non-linear filter could be used during detection. This is assuming that detection uses the magnitude information only and that the added complexity of two FFT computations is acceptable from a speed viewpoint. For example, $$M\text{comb}=K\cdot M+K'\cdot M'$$

where Mcomb is the combined magnitude, M is the original magnitude, M' is the post-filter magnitude, K and K' are weight vectors, the operation. represents an element-wise multiply and the + represents an element-wise add. The weights K and K' could either be fixed or adaptive. One choice of the weights could be higher values for K for the lower frequencies and lower values for K for the higher frequencies. K' on the other hand would have higher values for the higher frequencies and lower values for the lower frequencies.

Note that although a linear combination is given above, a non-linear combination could as well be devised.

Combining Non-Linear Filter Output with the Original Watermarked Signal

Similar to the weighted combination of the magnitude information, the non-linear filter outputs can also be combined with the watermarked signal. Here, the combination is computed in the time domain and then the Fourier transform of the combined signal is calculated. Given that the dynamic range of the filter outputs can be different than that of the signal before filtering, a weighted combination should be used.

Repeated Application of Non-Linear Filters

Another technique is multiple applications of one or more non-linear techniques. Although computationally more expensive, this can provide additional enhancements in recovering the watermark signal. One example is multiple application of the Dualaxis1D filter: a Dualaxis1D filter is first applied to the input audio signal, and the Dualaxis1D filter operation is then repeated on the output of the first Dualaxis1D filter. We have found that this enhances peaks for a peak-based frequency domain watermark.

Applying Non-Linear Filtering to Equalized Signals

Equalization techniques modify the frequency magnitudes of the signal to compensate for effects of the audio system. In the case of watermark detection, the term equalization can be applied in a somewhat broad manner to imply frequency modification techniques that are intended to shape the spectrum with a goal of providing an advantage to the watermark signal component within the signal. We have found that application of equalization techniques before the use of the non-linear techniques further improves watermark detection. The equalization techniques can be either general or specifically designed and adapted for a particular watermark signal or technique.

One such equalization technique that we have applied to a peak-based frequency domain watermark is the amplification of the higher frequency range. For example, consider that the output of differentiation (appropriately scaled) is added back to the original signal to obtain the equalized signal. This equalized signal is then subjected to the Dualaxis1D filter before computing the accumulated magnitude. The result is a 35% improvement over just using Dualaxis1D alone (as compared in the correlation domain)

Frequency Domain Filtering

As illustrated above, recovering a frequency domain watermark sometimes requires a correlation of the input Fourier magnitude (after applying the techniques above and after accumulation) with the corresponding Fourier magnitude representation of the frequency domain watermark. We have found that some of our weak signal detection techniques can be applied prior to the correlation computation as well. Note that this correlation could either be performed using the accumulated magnitudes directly or by resampling the accumulated magnitudes on a logarithmic scale. Log resampling converts frequency scaling into a shift. For the discussion below, we assume no frequency scaling.

The type of Fourier magnitude processing to apply depends on the characteristics of the watermark signal in the frequency domain. If the frequency domain watermark is a noise-like pattern then the non-linear filtering techniques such as Biaxis filtering, Dualaxis1D filtering, etc. can apply (with the filter applied in the frequency domain rather than in the time domain) If the frequency domain watermark consists of peaks, then a different set of filtering techniques are more suitable. These are described below.

Ratio Filtering in the Fourier Magnitude Domain

When the watermark signal in the frequency domain consists of a set of isolated frequency peaks, the goal is to recover these peaks as best as one can. The objectives of pre-processing or filtering in the Fourier magnitude domain are then to:

1. Identify likely peaks including weak peaks
2. Enhance weak peaks
3. Eliminate or suppress non-peaks (noise)
4. Normalize the frequency domain values for processing by the correlation process that follows
5. Constrain contribution of spurious peaks
6. Limit the contribution of any individual peak, so that the correlation is not dominated by a few peaks.

A non-linear "ratio" filter achieves the above objectives. The ratio filter operates on the ratio of the value of the magnitude at a frequency to the average of its neighbors. Let F be the frequency magnitude value at a particular location. Let avg be the average of the immediate neighbors of F (i.e. avg=(F−+F+)/2). Then the filtered output at the location of F is given by, Ratio=F/avg;

for avg values>0 and =0 for avg<0.0001 if (Ratio>1.6)

Output=1.6

The threshold of 1.6 chosen for the filter above is selected based on empirical data (training set). In addition, the filter can be further enhanced by using a square (or higher power) of the ratio and using different threshold parameters to dictate the behavior of the output of the filter as the ratio or its higher powers change.

Cepstral Filtering

Cepstral filtering is yet another option for pre-filtering method that can be used to enhance the watermark signal to noise ratio prior to watermark detection stages. Cepstral analysis falls generally into the category of spectral analysis, and has several different variants. A cepstrum is sometimes characterized as the Fourier transform of the logarithm of the estimated spectrum of the signal. However, to give a broader perspective of the transform and its implementation, we provide some background, as there are many ways to implement it.

The cepstrum is a representation used in homomorphic signal processing, to convert signals combined by convolution into sums of their cepstra, for linear separation. In particular, the power cepstrum is often used as a feature vector for representing the human voice and musical signals. For these applications, the spectrum is usually first transformed using the mel scale. The result is called the mel-frequency cepstrum or MFC (its coefficients are called mel-frequency cepstral coefficients, or MFCCs). It is used for voice identification, pitch detection, etc. The cepstrum is useful in these applications because the low-frequency periodic excitation from the vocal cords and the formant filtering of the vocal tract, which convolve in the time domain and multiply in the frequency domain, are additive and in different regions in the quefrency domain.

In watermarking, cepstral analysis can likewise be used to separate the audio signal into parts that primarily contain the watermark signal and parts that do not. The cepstral filter separates the audio into parts, including a slowly varying part, and the remaining detail parts (which includes fine signal detail). For some of our example watermark structures, particularly the frequency domain DSSS implementation, the watermark resides primarily in the part with fine detail, not the slowly varying part. A cepstral filter, therefore, is used to obtain the detail part. The filter transforms the audio signal into cepstral coefficients, and the first few coefficients representing the more slowly varying audio are removed, while the signal corresponding to the remaining coefficients is used for subsequent detection. This cepstral filtering method provides the additional advantage that it preserves spectral shape for the remaining part. When the perceptual model of the embedder shapes the watermark according to the spectral shape, retaining this shape also benefits detection of the watermark.

Cepstral Filtering, Combined with Other Filter Stages and Alternatives

We have found that combining cepstral filtering with additional filter stages provides improved watermark detection. In particular, one implementation of the frequency domain DSSS method applies non-linear filtering to the part remaining after cepstral filtering. There are several variations that can be applied, and we describe a framework for designing the filter parameters here.

First, we note that the 1D non-linear filters explained previously (e.g., Biaxis, Quadaxis and Dual axis) may be applied to the cepstral filtered output across the dimension of frequency, across time, or both frequency and time. In the latter case, the filter is effectively a 2D filter applied to values in a time-frequency domain (e.g., the spectrogram). For the adjacent frame, reverse embedding embodiment of frequency domain DSSS, the time frequency domain is formed by computing the spectrum of adjacent frames. The time dimension is each frame, and the frequency dimension is the FFT of the frame.

Second, the non-linear filters that apply to each dimension are preferably tuned based on training data to determine the function that provides the best performance for that data. One example of non-linear filter is one in which a value is compared with its neighbors' values or averages with an output being positive or negative (based on sign of the difference between the value and the neighborhood value(s)). The output of each comparison may also be a function of the magnitude of the difference. For instance, a difference that is very small in magnitude or very large may be weighted much lower than a difference that falls in a mid-range, as that mid-range tends to be a more reliable predictor of the watermark. The filter parameters should be tuned separately for time and frequency dimensions, so as to provide the most reliable predictor of the watermark. Note that the filter parameters can be derived adaptively by using fixed bit portions of the watermark to derive the filter parameters for variable watermark payload portions.

For some implementations, the cepstral filtering may not provide best results, or it may be too expensive in terms of processing complexity. Another filter alterative that we have found to provide useful results for frequency domain DSSS is a normalization filter. This is implemented for frequency magnitude values, for example, by dividing the value by an average of its neighbors (e.g., 5 local neighbors in the frequency domain transform). This filter may be used in place of the cepstral filter, and like the cepstral filter, combined with non-linear filter operations that follow it.

Filtering and Phase (Translation) Recovery

Recovering the correct translation offset (i.e., phase locking) of the watermark signal in the audio data can be accomplished by correlating known phase of the watermark with the phase information of the watermarked signal. In one of our peak based frequency domain watermark structures, each frequency peak has a specified (usually random) phase. The phases of the frequency domain watermark can be correlated with the phases (after correcting for frequency shifts) of the input signal. The non-linear weak signal detection techniques described above are also applicable to the process of phase (translation) recovery. The filtering techniques are applied on the time domain signal before computing the phases. The Biaxis filter, Quadaxis filter and the Dualaxis1D filter are all suitable for phase recovery.

Magnitude Information Vs. Phase Information

Our experiments show that the phase information outlasts the magnitude information in the presence of severe degradation caused by noise and compression. This finding has important consequences as far as designing a robust watermarking system. As an example, imparting some phase characteristics to the watermark signal may be valuable even if explicit synchronization in the frequency domain is not required. This is because the phase information could be used for alignment in the time domain Another example is forensic detectors. Since the phase information survives long after the magnitude information is destroyed, one can design a forensic detector that takes advantage of the phase information. An exhaustive search could be computed for the frequency domain information and then the phase correlation computed for each search point.

Magnitude Only Nonlinear Filter

Indeed, for some implementations, we have found that retaining the phase of the original audio boosts detection, particularly when combined with filtered magnitude information. In particular, in this approach, the phase of the audio segment is retained. The time domain version of the audio signal is passed through non-linear filtering. Then, after this filtering, the filtered version is used to provide the magnitude (e.g., Fourier Magnitude of the filtered signal), while the retained original phase provides the phase information. Further detection stages then proceed with this version of the audio data.

Non-Linear Weak Signal Detection Techniques for Enhancing Time Domain Watermarks The preceding discussion of filters discussed weak signal detection techniques for recovering frequency domain watermarks and phase (translation) information. Our experimentation shows that the same techniques that we found useful for frequency domain watermarks also directly apply to recovering time domain watermarks. Our example for time domain watermarks is a time domain DSSS described above. We have found that some of the non-linear filtering techniques described above also help in extracting time domain watermark signals. The main principles are similar—the filters help in removing host audio data while enhancing the watermark signal.

The Biaxis filter and the Dualaxis1D filter provide substantial benefit in improving the SNR of time domain watermark signals. We are currently investigating the application of the other non-linear filters and combination filters to for the enhancement of time domain watermarks. For the time domain DSSS implementations highlighted above, we have found that extended dual axis, or a combination of differentiation and Quadaxis provide good results.

Determining Regions of Audio Signal for Watermark Detection

As described above, determining whether a portion of an audio signal is speech or music or silence can be advantageous in both watermark detection and in watermark embedding.

During embedding, this knowledge can be used for selecting watermark structure and perceptually shaping the watermark signal to reduce it audibility. For instance, the gain applied to the watermark signal can be adaptively changed depending on whether it is speech, music or silence. As an example, the gain could be reduced to zero for silence, low gain, with adapted time-frequency structure for speech, and higher gain for music, except for classes like instrumental or classical pieces, in which the gain and/or protocol are adapted to spread a lower energy signal over a longer window of time.

Within speech, a further classification of voiced/unvoiced speech can be used to additional advantage. Note that the frequency characteristics of voiced and unvoiced speech are much different. This could again result in different embedding gain values.

During watermark detection, it is often useful to identify regions of the signal where the watermark may be present and then process regions where the likelihood of finding the watermark is high. This is desirable from a point of view of increasing the watermark signal-to-noise ratio (SNR), particularly in conjunction with some of the non-linear techniques mentioned in this document. If non-watermarked regions are processed through the non-linear filters, they can cause a drop in SNR when using accumulation techniques. Also, detecting favorable regions for processing can also reduce the amount of processing (and/or time) required for watermark detection.

During detection, the speech/music/silence determination can be used to a) identify suitable regions for watermark detection (analogous to techniques described in U.S. Pat. No. 7,013,021, whereby, say, silence regions could be discarded from detection analysis), and b) to appropriately weight the speech and music regions during detection. U.S. Pat. No. 7,013,021 is hereby incorporated by reference in its entirety. Determining silence regions from non-silence region provides a way of discarding signal regions that are unlikely to contain the watermark signal (assuming that the watermark technique does not embed the watermark signal in silence). Silence detection techniques improve audio watermark detection by adapting watermark operations to portions of audio that are more likely to contain recoverable watermark information, consistent with the embedder strategy of avoiding perceptible distortion in these same portions.

Note that for the purpose of watermark embedding and detection, the discrimination capability may not need to be extremely accurate. A rough indication may be useful enough. Somewhat more accuracy may be required on the embedding end than the detection end. However, on the embedding end, care could be taken to process the transitions between the different sections even if the discrimination is crude.

Simple time domain audio signal measure such as energy, rate of change of energy, zero crossing rate (ZCR) and rate of change of ZCR could be employed for making these classification decisions.

Silence/Speech/Music Discrimination

The objective of silence detection is essentially to detect the presence of speech or music in a background of noise. Several algorithms have been proposed in the audio signal processing literature for:

- determining endpoints of utterances, L. R. Rabiner, M. R. Sambur, An Algorithm for Determining the Endpoints of Isolated Utterances, The Bell System Technical Journal, February 1975.
- for detection of voiced-unvoiced-silence regions of speech, L. R. Rabiner, M. R. Sambur, Voiced-Unvoiced-Silence Detection using the Itakura LPC Distance Measure, ICASSP 1977; and
- for speech/music classification; M. J. Carey, E. S. Parris, and H. Lloyd-Thomas, A comparison of features for speech, music discrimination. Proceedings of IEEE ICASSP'99. Phoenix, USA, pp. 1432-1435, 1999; J. Mauclair, J. Pinquier, Fusion of Descriptors for Speech/Music Classification, Proc. Of 12th European Signal Processing Conference (EUSIPCO 2004), Vienna, Austria, September 2004.
  - These techniques use a multitude of features for speech/music/silence detection.

Although some of these techniques are currently rather involved (for the sake of implementation in a watermark detector) from a performance standpoint, there are some basic features that could be effectively put to use in watermark detection. Two such features, which are based on measures of the input audio signal, are energy and zero crossing rate (ZCR). See, e.g., L. R. Rabiner, M. R. Sambur, An Algorithm for Determining the Endpoints of Isolated Utterances, The Bell System Technical Journal, February 1975; L. R. Rabiner, M. R. Sambur, Voiced-Unvoiced-Silence Detection using the Itakura LPC Distance Measure, ICASSP 1977; and J. Mauclair, J. Pinquier, Fusion of Descriptors for Speech/Music Classification, Proc. Of 12th European Signal Processing Conference (EUSIPCO 2004), Vienna, Austria, September 2004. See also, e.g., B. Kedem, Spectral analysis and discrimination by zero-crossings, Proceedings of IEEE, Vol 74, No. 11, November 1986.

Energy is the sum of absolute (or squared) amplitudes within a specified time window (frame). ZCR is the number of times the signal crosses the zero level within a specified time window (frame). Increase in the Energy measure usually indicates the onset of speech or music and the end of silence. Conversely, decrease in Energy indicates the onset of silence. ZCR is used to determine the presence of unvoiced regions of speech that tend to be of lower Energy (comparative to silence) and adjust the silence determination given by the Energy measure accordingly.

In audio watermark detection, the aim of silence classification is to roughly identify regions where speech/music activity is present. High accuracy of silence detection, though desirable, is not necessarily critical for use in watermark detection.

Applications

As described throughout this disclosure and the incorporated patent literature, there are numerous uses of the audio processing technology described and incorporated herein. In this section, we elaborate on some of them.

Audio watermarks provide a data channel in audio that may be used to carry various types of data, to validate the source of data, and to determine position of a receiving device relative to a sound source. This creates new systems and applications for exploiting this data.

Vehicle Communication

One category of application is to convey identifying information among neighboring devices that is used to identify a source and reliably trigger actions in a receiving device. In this category, one use is to enable emergency vehicles to identify themselves to neighboring devices, such as audio receivers in cars or mobile devices. For example, law enforcement and/or emergency vehicles can be configured to emit emergency audio signals (e.g., sirens) with embedded watermarks that provide a reliable identifier of the source and enable conveyance of authenticable data to neighboring devices (such as through microphones in or connected to personal navigation devices, vehicle computers, smartphones and other mobile devices).

A private or dedicated emergency watermark protocol can be used to create a secure communication channel within audible emergency signals. Such a protocol can be designed to have a desired level of security by using private encoding/decoding methods, private watermarking keys, and encrypted watermark message payloads. Updates to the security protocol can be broadcast, e.g., using broadcast encryption referenced above.

The watermark encoding is reliably conveyed in the conventional emergency siren, using existing equipment to emit the data carrying sound, and thus, there is no hardware upgrade cost, for the fleet of emergency vehicles. Audio capture through microphones on receiving devices is effective, and requires little or no hardware upgrade. Mobile telephones, and in-car audio equipment, already have microphones and processing capability to support watermark decoding and also include user interface components such as video display and speech synthesis for output of alerts and information pertaining to the emergency. The data conveyed in the emergency siren can be used to switch the receiver to another data channel for information about the emergency, via another wireless connection, such as a cellular or WiMax or other RF signaling channel.

This type of private protocol enables receiving devices to identify the source, authenticate the source and the data channel, and respond automatically to it. The data channel can be used to trigger applications such as displaying the location of the emergency vehicle relative to the vehicle (e.g., in a personal navigation system display, which depicts the emergency vehicle on a map relative to the location of the receiving device or vehicle). The data channel can also be used to control the traffic light system, and similarly alert the user regarding changes in the traffic light system and instructions on how to safely avoid the emergency vehicle for display in onboard navigation systems or devices (such as smartphones or GPS devices). Traffic light systems, in this configuration, are configured with a microphone and watermark detector circuitry that controls the nearby traffic light, and relays traffic control information to other traffic lights and vehicles in the area. The traffic light system can distribute data to other traffic control systems through a separate wire or wireless network or through emitting audio signaling, just as the emergency vehicle has done. The data channel can be used to convey GPS coordinates of the emergency vehicle, as well as GPS coordinates of potential safety hazards. The receiving devices can be configured with microphone arrays to provide alternative or additional means of determining the position of the source of the siren using audio localization methods, as discussed above and in incorporated patent publications on this topic.

A related application is for vehicles to communicate information to each other and pedestrians' mobile devices through their horns or other generated sounds. Such a data channel can be used to enhance systems for collision avoidance by providing a means to communicate alerts, and vehicle proximity and location information among neighboring vehicles and vehicle to a nearby pedestrian's mobile device.

Another related application is use of audio signaling to enhance vehicle safety, particularly hybrid electric vehicle safety. The National Highway Traffic Safety Administration has issued a notice of proposed rulemaking for adding artificial sounds to these vehicles as they are often difficult to hear, and cause accidents. These artificial sounds provide a host audio signal for an auxiliary data channel. This data channel can be used not only to convey alerts and derive proximity for safety, but to more generally enable an intelligent traffic control system. Each vehicle can be programmed to have a unique identifier encoded its artificial sound output. The data channel can be designed to be encoded in audio warning signals, as well as an artificially generated noise-like signal, during normal operation, which is not distracting or displeasing to the driver or others. As this system is deployed ubiquitously, it provides a means for monitoring and controlling traffic, as well as communicating among neighboring vehicles, for collision avoidance and automated navigation of vehicles.

Audio Based Augmented Reality

Augmented reality applications require devices to ascertain a frame of reference for a device, and based on this reference, construct generated graphics that augment a display of the surrounding scene. The frame of reference is derived from visual cues such as machine readable codes like bar codes or watermarks, feature recognition or feature tracking, structure from motion, and combinations thereof. See our U.S. Pat. No. 9,684,941, entitled DETERMINING POSE FOR USE WITH DIGITAL WATERMARKING, FINGERPRINTING AND AUGMENTED REALITY, filed Mar. 7, 2013, which is hereby incorporated by reference. See also audio related localization patent literature incorporated above: US Patent Publications 20120214544 and 20120214515. As introduced above, audio localization, particularly with the aid of auxiliary data encoding in the audio, provides yet another cue for constructing the augmented reality reference. This is particularly useful for retail shopping venues and like public places with audio equipment for providing background entertainment and public announcements. The audio data channel provides a means to convey product information, offers, promotions, etc. to the shopper's mobile device, as well as allow that device to ascertain its position.

In crowded shopping aisles and hallways, visual cues alone may be unreliable and un-attainable, or inefficient in terms of mobile device resource consumption. The audio watermark signaling enables the device to construct a frame of reference, notwithstanding visual obstructions. It also allows the device to save battery life, as the audio processing can be performed in the background on audio captured through the microphone, without turning on the camera and processing a video feed. This audio-based frame of frame of reference can be used to construct a model of a hallway or aisle, and associated product shelving, upon which location based offers and product information can be generated and displayed on the user's device (e.g., smart phone or wearable computing system, such as Google Glass). A database storing planogram and product information for that location can be fetched in the background and used to generate the graphical model for rendering to the user's display. Then, when the information is ready, the user can be alerted to turn on the display and access a location specific display, that is tailored to the products and surrounding objects, adapted from the planogram database or other product configuration information in the retailer's database, as well as user specific preference, gleaned from the user's interests, such as a shopping list, selected promotion, coupon or offer that incented the shopper to visit the store.

As noted above, the audio positioning derived from capturing audio from nearby sources may be combined with positioning information from motion sensors, such as MEMS implementations of gyroscopes, accelerometers and magnetometers.

Further, the audio signaling may include layers of watermarks, such as high frequency, low frequency, and time domain watermarks described above. One layer, such as a frequency domain watermark, may be used to provide a strength of signal metric and audio source identifier, associated with location of the audio source from which the mobile device position may be derived. Another layer, such as a time domain DSSS layer, may be used to determine relative time of arrival from different audio sources, and include a similar source identifier. A high frequency watermark layer, at or around the upper bound of the range of the human auditory system, can be used to provide additional positioning information due to its wave front properties. It is less likely to create echoes and has a more planar-like wave front relative lower frequency audio signals. Positioning and orientation information derived from these layers may be used to form a frame of reference for augmented reality displays.

Audio Control

In one aspect, the data channel provided by an audio watermark signal can be used to identify an audio output device (e.g., a loudspeaker, also referred to herein as a "speaker") or a group or set of speakers (e.g., of the type found in public address systems, radio and television receivers, portable digital media players, smartphones, tablet computers, laptop computers, desktop computers, mobile phones, sound reinforcement systems for theaters and concerts, etc.). Generally, a speaker is configured to generate sound in response to receiving an electronic signal, wherein the sound produced corresponds to the electronic signal applied. The speaker or set may be communicatively coupled (e.g., via wired or wireless connection, either directly or indirectly via any network) to one or more audio output control devices configured to apply various electronic signals to the speaker(s), thereby controlling the manner in which audio signals are output by the speaker(s)) as sound, a watermark embedder as exemplarily described above, or any combination thereof. An exemplary audio output control device may include one or more devices such as remote servers configured to stream music or other audio information—including an audio watermark—to be output by the speaker(s), radio receivers, television receivers, portable digital media players, smartphone or other mobile phones, tablet computers, laptop computers, desktop computers, etc., each of which is generically referred to herein as a "audio output control device"). A microphone-equipped receiving device (e.g., a portable digital media player, a smartphone or other mobile phone, a tablet computer, a laptop computer, etc.) may be used to capture audio signals output by the speaker(s) and perform ambient detection on the captured audio signals (e.g., in the manner exemplarily described above). In the event that an embedded audio watermark is detected within the audio signal output by the speaker(s), the receiving device can extract from the watermark, information identifying the speaker or set thereof. As discussed in greater detail below, this identification information can then be used control or modify one or more audio signals (e.g., the host audio signal, the audio watermark signal, or both) output by the speaker(s).

In one embodiment, the identification information can be used to control or modify at least one attribute of the host audio signal output by the identified speaker(s). For example, the receiving device can be configured to directly control or modify an attribute of the host audio signal output by the identified speaker(s). In such an example, the receiving device can be coupled (e.g., via wired or wireless connection, either directly or indirectly via any network) to the identified speaker(s). In another example, the receiving device can be configured to indirectly control or modify an attribute of the host audio signal output by the identified speaker(s) by interfacing with one or more of the aforementioned audio output control devices (e.g., via wired or wireless connection, either directly or indirectly via any network). One attribute of the host audio signal that may be adjusted includes the loudness with which the host audio signal is output by the identified speaker(s). For example, the loudness can be adjusted (e.g., raised or lowered) to ensure that the audio watermark (e.g., provided as a high frequency watermark) is not likely to be perceived by a human listener, or as otherwise desired. Other attributes of the host audio signal that may be controlled include the type of audio content or song or other audio program output by the identified speaker(s), etc.

In another embodiment, the identification information can be used to control or modify at least one attribute of the audio watermark signal output by the identified speaker(s). For example, the receiving device can be configured to directly or indirectly control or modify an attribute of the audio watermark signal output by the identified speaker(s) (e.g., similar to the manner exemplarily discussed above with respect to modification of the host audio signal). In such an example, the watermark embedder is located at the receiving device. In another example, the watermark embedder is remote from the receiving device, but is coupled to (e.g., via wired or wireless connection, either directly or indirectly via any network) or otherwise integrated into one or more of the aforementioned audio output control devices. One attribute of the audio watermark signal that may be adjusted is the strength of the watermark signal relative to the host audio signal. For example, the strength of the audio watermark signal can be adjusted (e.g., raised or lowered) to enhance ambient detection of the audio watermark signal, to reduce human perceptibility of the audio watermark signal, or the like or a combination thereof.

In one embodiment, modification of the host audio signal or the audio watermark signal (each generically referred to as an "audio signal") can be accomplished manually (e.g., by a user of receiving device) or automatically. To implement automatic modification of the audio signal, the receiving device may sense, detect or estimate one or more attributes (e.g., volume, frame error rate, sign-to-noise ratio, signal strength, etc.) of one or more of the audio signals output by the identified speaker(s), which may then be compared to predetermined reference values for the sensed/detected/estimated attributes. The comparison may be performed locally (i.e., at the receiving device), remotely (e.g., at the watermark embedder or at one or more of the aforementioned audio output control devices, etc.), or a combination thereof. Based on the result of the comparison, an attribute adjustment signal can be generated (e.g., at the receiving device, the watermark embedder, at one or more of the audio output control devices, or a combination thereof) and transmitted to the one or more of the audio output control devices. When the attribute adjustment signal is executed by the appropriate audio output control device, one or more attributes of audio signal(s) output by the identified speaker(s) is adjusted to be at or closer to the corresponding one of the predetermined reference values of the attributes sensed, detected, or estimated at the receiving device. In one aspect, the predetermined reference value may correspond to the strength of the audio watermark signal relative to the host audio signal, and may be predetermined to ensure that the audio watermark is imperceptible (or at least substantially imperceptible) to people within the hearing range of the identified speaker(s), yet capable of being reliably detected via ambient detection.

The receiving device and the audio output control device can be the same device, or they may be separate devices. Depending on the configuration of the receiving device, a user might hold the receiving device in such a manner as to cover the microphone (e.g., with their hand, thumb or finger(s)), which can make reliable ambient detection difficult or impossible. To solve this problem, the receiving device can be provided with a speaker and can be driven to output a calibration audio signal (e.g., an audio watermark signal or other signal, such as a tone), which the receiving device can listen for via the on-board microphone. The receiving device can be driven to output the calibration audio signal briefly (e.g., lasting half a second) and repeatedly (e.g., periodically, every 30 seconds). In one aspect, the receiving device can be driven to output the calibration audio signal at a sufficiently low volume such that the calibration audio signal is imperceptible (or at least substantially imperceptible) to the user. If the calibration audio signal output by the speaker of the receiving device is not detected via the on-board microphone, the receiving device can be driven to alert the user (e.g., visually or audibly), indicating that the microphone could be obstructed and requesting the user to remove the obstruction.

Additional Exemplary Features

The following provides some additional, non-limiting exemplary features and configurations:

D1. A watermarking system including a classifier that discriminates audio segments based on types, including speech and music.

E1. A method of embedding a watermark in an electronic audio signal, the method comprising:

generating a watermark signal;

mapping the watermark signal to pairs of embedding locations;

in a pair of embedding locations, inserting the watermark signal in a differential relationship of the pair.

E2. The method of claim E1 wherein watermark data is conveyed in the sign of the difference between quantities measured at the pair of embedding locations.

E3. The method of claim E1 wherein pairs are adaptively selected so as to minimize changes to embed a corresponding watermark signal.

E4. The method of claim E1 wherein pairs are adaptively selected so as to maximize robustness of the watermark signal.

E5. The method of claim E1 wherein relationships among pairs are adjusted minimally, if at all, to correspond to elements of a watermark signal.

E6. An audio signal processing system comprising:

a watermark signal constructor for generating a watermark signal; and a watermark inserter, in communication with the watermark signal constructor for inserting elements of the watermark signal into pairs of embedding locations of an electronic audio signal, the elements of the watermark signal being encoded in a differential relationship of, or with reversing polarity in, the first and second members of a pair of embedding locations.

E7. The audio signal processing system of claim E6 including:

a perceptual modeling system comprising perceptual models applied to the audio signal to control the insertion of the watermark signal into the electronic audio signal by the watermark inserter, the perceptual modeling system including one or more classifiers for classifying audio type and adapting a perceptual model based on the audio type.

F1. A method of detecting a watermark in an electronic audio signal, the method comprising:

obtaining audio signal features from pairs of embedding locations in which a watermark signal is embedded in reverse polarity in first and second members of a pair;

in a pair of embedding locations, combining the features so that the reverse polarity of the watermark is used to enhance the watermark signal in the features, and the remaining signal is reduced.

F2. An audio signal processor comprising:

a pre-process for segmenting an electronic audio signal;

a watermark detector for measuring audio features at embedding locations and determining estimates of watermark signal elements encoded in a differential relationship of, or with reversing polarity in, first and second members of a pair of embedding locations.

G1. A method of embedding a watermark in an electronic audio signal, the method comprising:

analyzing the audio signal for a harmonic;

for embedding locations corresponding to the harmonic, structuring the watermark signal to be masked by the harmonic.

G2. The method of claim G1 including:

detecting a complex tone including harmonics;

generating a watermark signal that exploits a harmonic relationship in the complex tone, including increasing a first harmonic and decreasing a second harmonic in the harmonic relationship.

G3. The method of G2 wherein generating a watermark signal comprises generating a frequency domain signal with plural elements mapped to corresponding plural frequency locations in an audio frame, with the plural elements being structured having at least partially offsetting values in the first and second harmonics.

H1. A method of embedding a watermark in an electronic audio signal, the method comprising:

analyzing the audio signal to identify an embedding location that does not have sufficient signal in which to embed a watermark signal element;

boosting the audio signal at the embedding location; and embedding the watermark signal element at the embedding location, using the boosting to mask audibility of a change in the audio signal made to embed the watermark signal.

H2. The method of claim H1 wherein the analyzing comprises analyzing a spectral domain of a segment of the audio signal, and wherein boosting comprises boosting the audio signal at frequency locations where the audio signal has sparse spectral components.

H3. The method of claim H2 wherein in boosting comprises applying an equalizer function to the segment.

H4. The method of claim H3 including controlling the equalizer function based on a measure of correlation of equalized audio segment relative to an original audio segment.

H5. The method of claim H4 including varying the equalizer function over time segments, and keeping change due to applying the equalizer from segment to segment within a constraint.

I1. A method of embedding a watermark in an electronic audio signal, the method comprising:

determining whether an audio segment of the audio signal is stationary or non-stationary;

adapting resolution of a perceptual model based on whether the audio segment is stationary or non-stationary; and inserting a watermark into the audio segment using the adapted perceptual model.

J1. A method of detecting a watermark in an electronic audio signal, the method comprising:

estimating rake receiver parameters using known attributes of a watermark signal in the electronic audio signal;

forming a rake receiver using the estimated rake receiver parameters, wherein the rake receiver detects reflections of a watermark signal due to multipath; and combining the reflections of the watermark signal to improve watermark signal to noise ratio.

K1. A method of embedding a watermark in an electronic audio signal, the method comprising:

generating a watermark signal for insertion into the electronic audio signal;

evaluating perceptual audio quality of the electronic audio signal relative to changes of that electronic audio signal corresponding to the watermark signal through automated application of a perceptual audio quality measure that computes audio quality parameters based on a human auditory model, including parameters for estimating quality based on a difference between the audio signal and a watermarked version of the audio signal;

updating a watermark embedding parameter based on the evaluating; and embedding the watermark signal into the electronic audio signal using the updated watermark embedding parameter.

K2. The method of claim K1 including:

evaluating robustness of a watermarked audio signal using bit error rate or detection rate metrics for the generated watermark signal in the watermarked audio signal; and based on the robustness, updating the watermark embedding parameter.

L1. A method of embedding a watermark in an electronic audio signal, the method comprising:

generating a watermark signal using orthogonal frequency division multiplexing in which auxiliary data is modulated onto OFDM carrier signals;

computing a frequency magnitude envelope for embedding locations in a frequency domain transform of the audio signal; and inserting the watermark signal by replacing audio signal frequency components with modulated OFDM carrier signals at the embedding locations while maintaining the frequency magnitude envelope at the embedding locations.

M1. A method of embedding a watermark in an electronic audio signal, the method comprising:

generating a watermark signal by modulating a carrier signal using a set of high frequency shaping patterns; and inserting the watermark signal into carrier signal.

M2. The method of claim M1, wherein the watermark signal is a time-varying signal.

M3. The method of claim M1, wherein the watermark signal is a periodic signal.

M4. The method of claim M1, wherein the watermark signal is a non-periodic signal.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for distinguishing among sources and calculating position may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

We claim:

1. An apparatus for embedding a digital watermark in an audio signal, the apparatus comprising:

memory for storing an audio signal;

means for identifying an embedding location within the audio signal that does not have sufficient signal in which to embed a digital watermark signal element;

means for boosting the audio signal at the embedding location; and means for embedding the digital watermark signal element at the embedding location, using boosting by said means for boosting to mask audibility of a change in the audio signal made to embed the digital watermark signal.

2. The apparatus of claim 1 wherein said means for identifying investigates a spectral domain of a segment of the audio signal, and wherein said means for boosting boosts the audio signal at frequency locations where the audio signal has sparse spectral components.

3. The apparatus of claim 2 wherein said means for boosting applies an equalizer function to the segment.

4. The apparatus of claim 3 including means for controlling the equalizer function based on a measure of correlation of equalized audio segment relative to an original audio segment.

5. The apparatus of claim 4 in which said means for controlling varies the equalizer function over time segments, and keeping change due to applying the equalizer from segment to segment within a constraint.

6. An apparatus for embedding a digital watermark in an audio signal, the apparatus comprising:

memory for storing an audio signal;

means for evaluating whether an audio segment of the audio signal is stationary or non-stationary;

means for adapting resolution of a perceptual model based on whether the audio segment is stationary or non-stationary, said means for adapting generating an adapted perceptual model; and a digital watermark embedder for a digital watermark into the audio segment using the adapted perceptual model.

7. An apparatus for detecting a digital watermark in an audio signal, the method comprising:

an input to receive an audio signal, the audio signal comprising a digital watermark encoded therein;

means for estimating rake receiver parameters using known attributes of a digital watermark signal in the audio signal;

a rake receiver using the estimated rake receiver parameters, wherein the rake receiver detects reflections of a digital watermark signal due to multipath; and means for combining the reflections of the digital watermark signal to improve digital watermark signal to noise ratio.

8. An apparatus for embedding a digital watermark in an audio signal, the apparatus comprising:

memory for storing an audio signal;

a digital watermark embedder configured to produce a digital watermark signal for insertion into the electronic audio signal;

means for evaluating perceptual audio quality of the electronic audio signal relative to changes of that audio signal corresponding to the digital watermark signal through application of a perceptual audio quality measure that computes audio quality parameters based on a human auditory model, including parameters for estimating quality based on a difference between the audio signal and a digital watermarked version of the audio signal, said means for evaluating generating an evaluation;

means for changing a digital watermark embedding parameter based on the evaluation, said means for changing generating a changed watermark embedding parameter; and wherein the digital watermark embedder is configured to embed the digital watermark signal into the audio signal using the changed watermark embedding parameter.

9. The apparatus of claim 8 including:

means for evaluating robustness of a watermarked audio signal using bit error rate or detection rate metrics for the generated digital watermark signal in the watermarked audio signal; and based on the robustness, prompting said means for changing to change the digital watermark embedding parameter.

10. The apparatus of claim 8, the apparatus comprising:

means for analyzing the audio signal for a harmonic;

in which said digital watermark embedder is configured to structure, the digital watermark signal to be masked by the harmonic for embedding locations corresponding to the harmonic.

11. The apparatus of claim 10 including:

means for detecting a complex tone including harmonics;

in which said digital watermark embedder is configured to generate a digital watermark signal that exploits a harmonic relationship in the complex tone, including increasing a first harmonic and decreasing a second harmonic in the harmonic relationship.

12. The apparatus of 11 wherein said digital watermark embedder is configured to generate a digital watermark signal comprising a frequency domain signal with plural elements mapped to corresponding plural frequency locations in an audio frame, with the plural elements being structured having at least partially offsetting values in the first and second harmonics.

13. An apparatus for embedding a digital watermark in an audio signal, the method comprising:

an input to receive an audio signal;

means for generating a digital watermark signal using orthogonal frequency division multiplexing in which auxiliary data is modulated onto OFDM carrier signals;

means for computing a frequency magnitude envelope for embedding locations in a frequency domain transform of the audio signal; and means for inserting the digital watermark signal by replacing audio signal frequency components with modulated OFDM carrier signals at the embedding locations while maintaining the frequency magnitude envelope at the embedding locations.

14. The apparatus of claim 13 comprising:

means for generating a high frequency digital watermark signal by modulating a carrier signal using a set of frequency shaping patterns at a frequency range of 10 to 22 kHz; and means for inserting the digital watermark signal into carrier signal.

15. The apparatus of claim 13, wherein the high frequency digital watermark signal is a time-varying signal.

16. The apparatus of claim 13, wherein the high frequency digital watermark signal is a periodic signal.

17. The apparatus of claim 13, wherein the high frequency digital watermark signal is a non-periodic signal.

18. The apparatus of claim 13 comprising means for weighting the audio signal with a weighting in a frequency range from 16 to at least 19 Khz, the weighting being selected to counter a drop in frequency response of audio equipment over the frequency range from 16 to at least 19 Khz.

* * * * *